Figure 1:
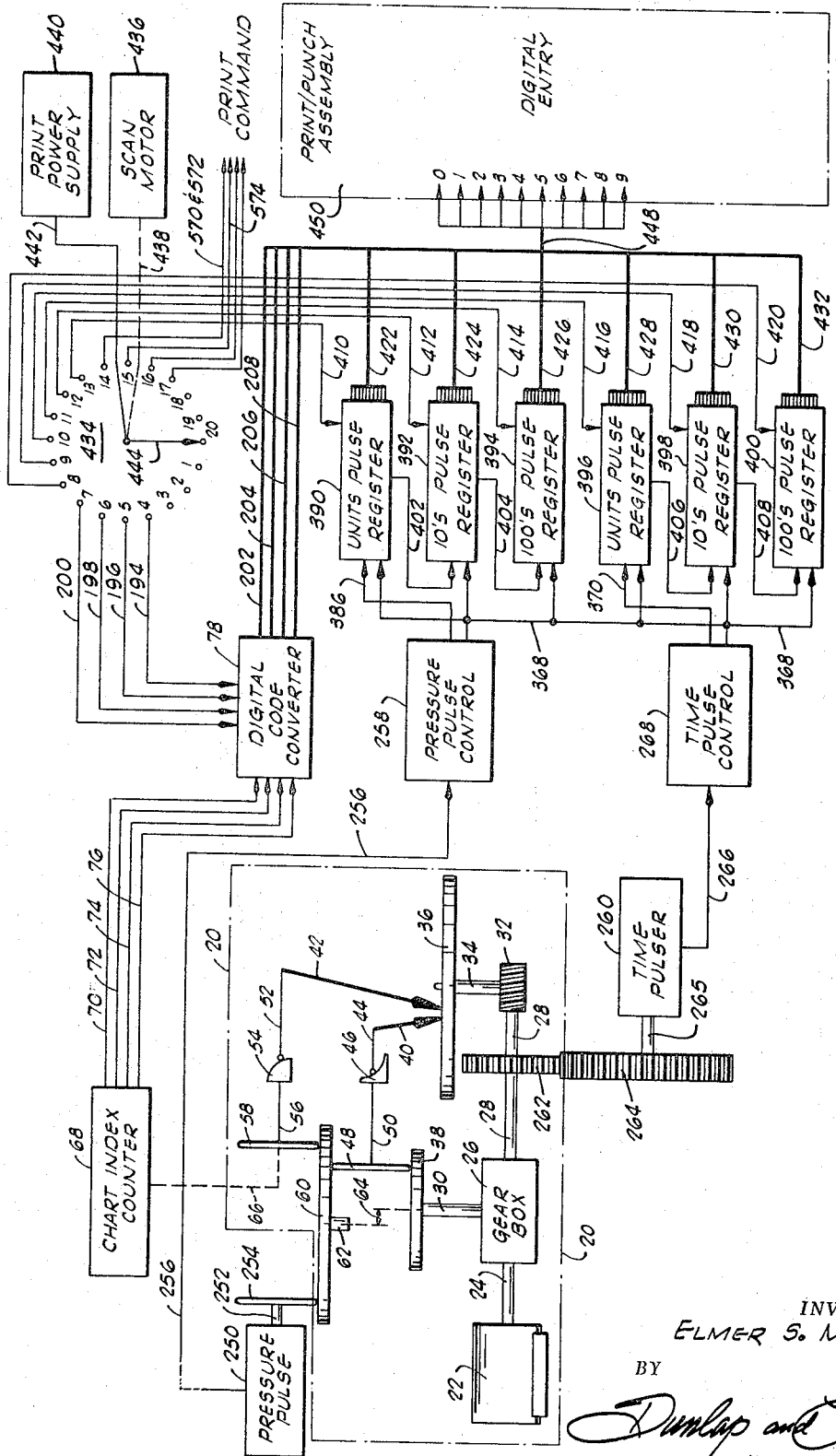

INVENTOR.
ELMER S. MESSER
BY
Dunlap and Laney
ATTORNEYS

Oct. 3, 1967   E. S. MESSER   3,344,985
INTEGRATING AND AVERAGING SYSTEM
Filed June 6, 1966   10 Sheets-Sheet 5

INVENTOR.
ELMER S. MESSER
BY
Dunlap and Laney
ATTORNEYS

Oct. 3, 1967 E. S. MESSER 3,344,985
INTEGRATING AND AVERAGING SYSTEM
Filed June 6, 1966 10 Sheets-Sheet 6
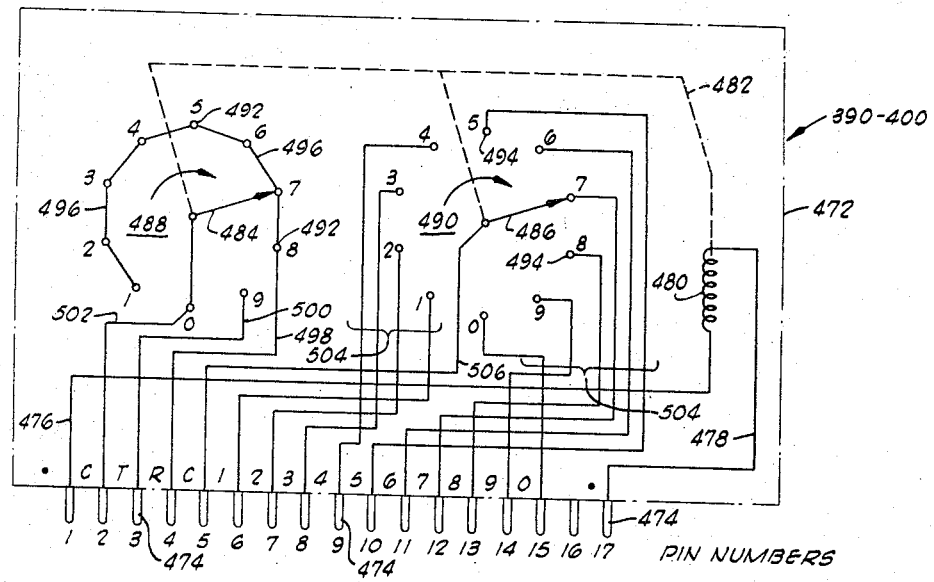
Fig. 13
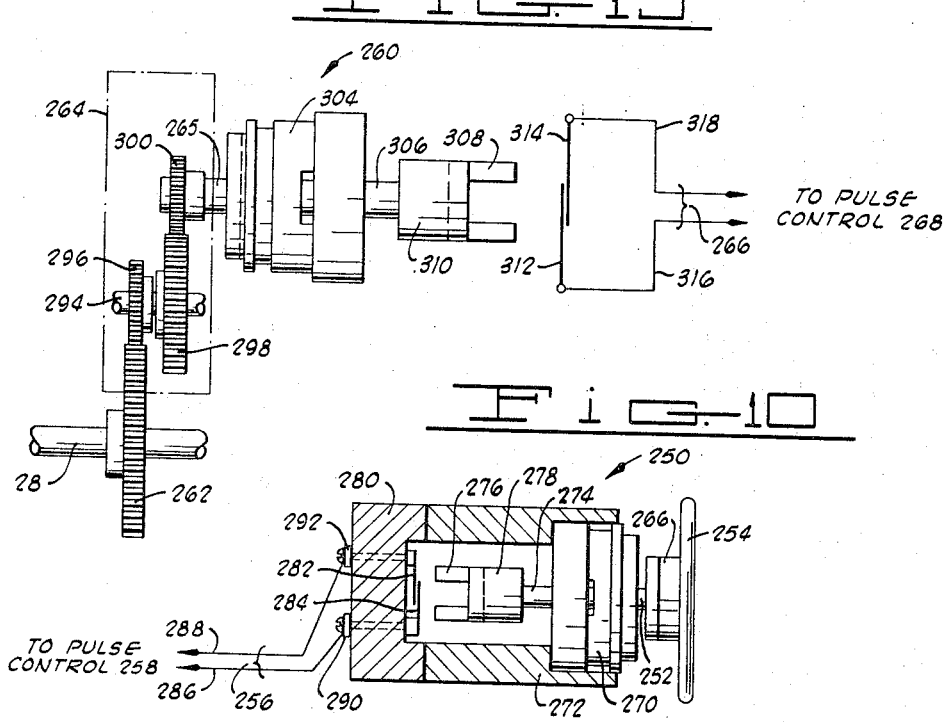
Fig. 10
Fig. 9
INVENTOR.
ELMER S. MESSER
BY
Dunlap and Laney
ATTORNEYS

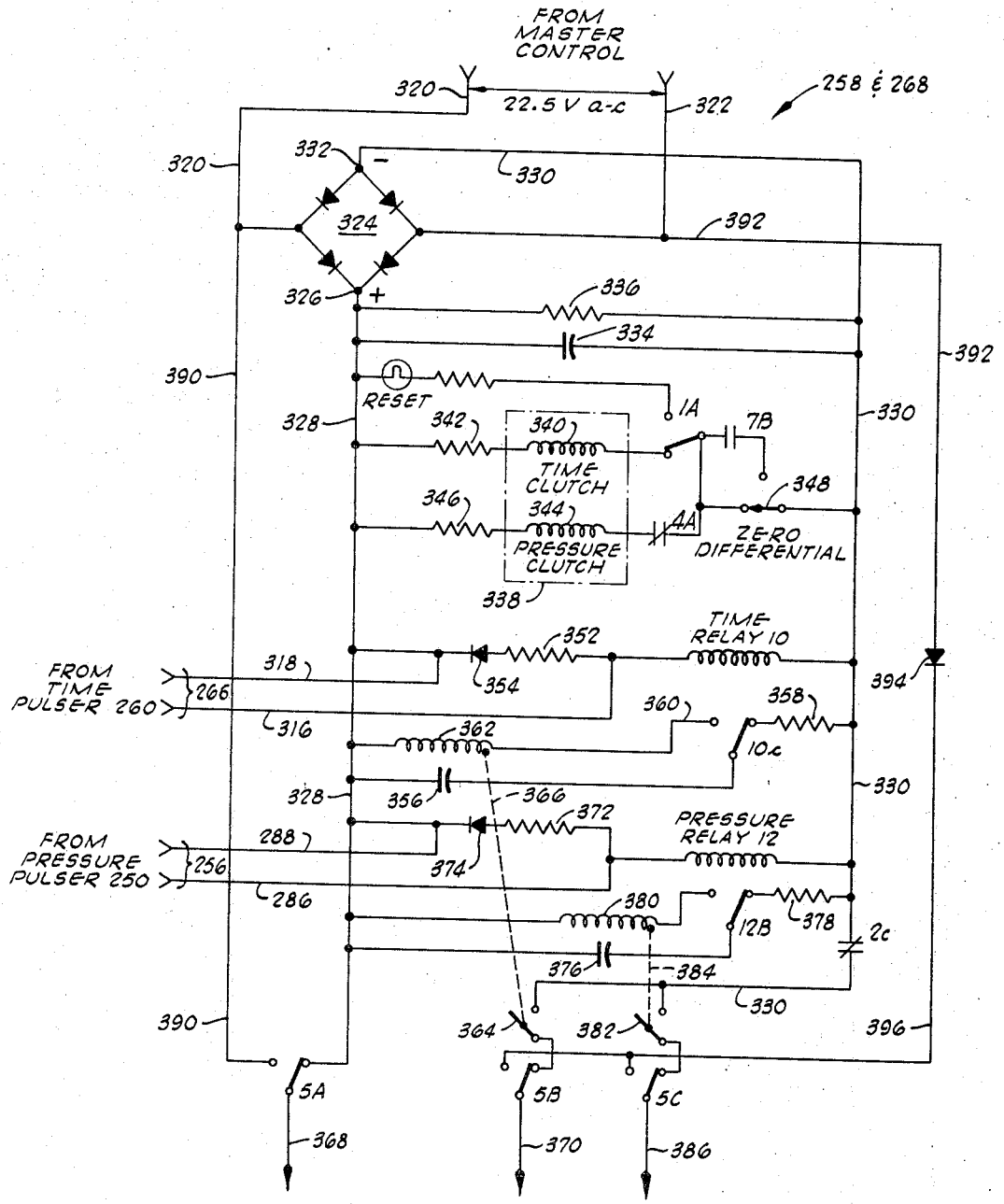

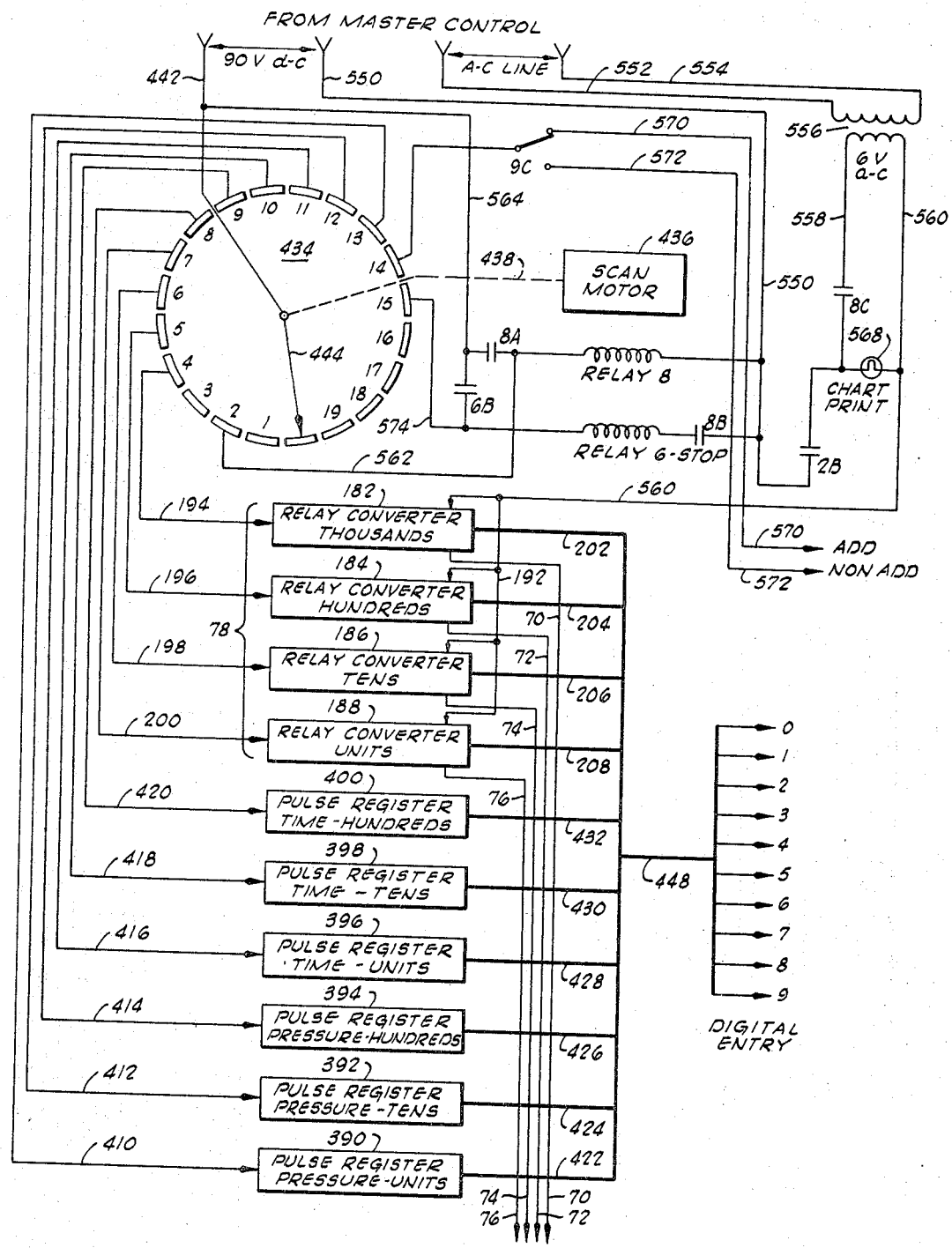

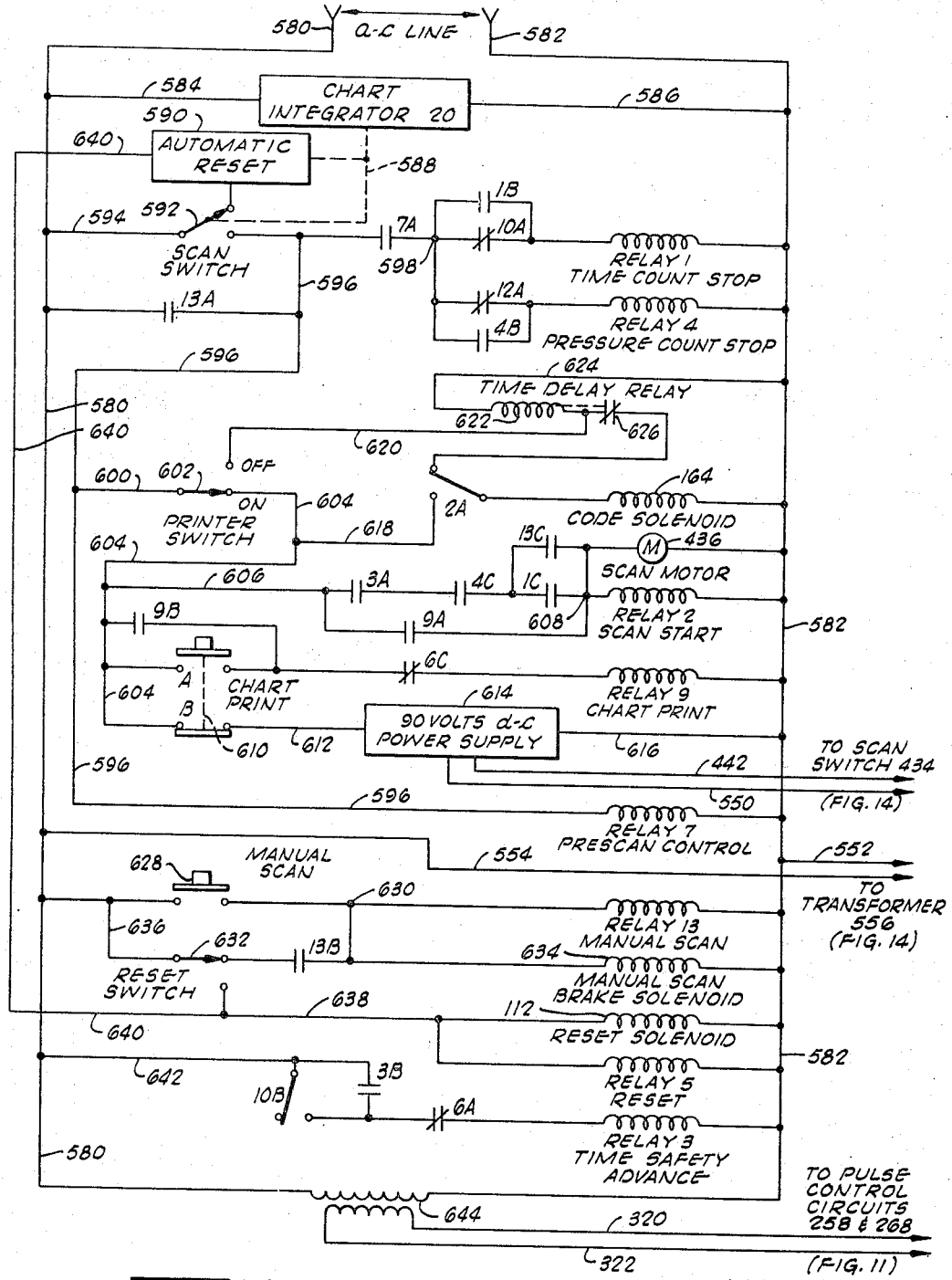

United States Patent Office 3,344,985
Patented Oct. 3, 1967

3,344,985
INTEGRATING AND AVERAGING SYSTEM
Elmer S. Messer, Tulsa, Okla., assignor to Flow Measurement Company, Inc., Tulsa, Okla., a corporation of Oklahoma
Filed June 6, 1966, Ser. No. 555,608
21 Claims. (Cl. 235—61)

This invention relates to improvements in the art of flow chart processing and, more particularly, but not by way of limitation, to an improved system for integrating and time-averaging static and differential flow pressures for further calculation and/or recording of particular flow characteristics.

This application is a continuation-in-part of U.S. application No. 270,908, filed Apr. 5, 1963, now abandoned, in the name of E. S. Messer.

The invention constitutes an improvement over previously employed integrator apparatus which provided analog integration of static and differential flow pressures as a function of time with totalizing read out. The improvement features enable an output of further read outs at the time function and static pressure function such that calculation is easily carried out to derive (1) actual flow time, (2) average absolute static pressure, (3) average differential pressure, and (4) total flow. Further, a printer and/or punch terminal equipment is coupled to store the necessary data for calculating the above time, pressure, and flow information on tape or other storage medium; such equipment also may enable eventual transition of all data to tape or punch card media for calculation by any commercially available computer.

The present invention contemplates an integrating and averaging system wherein a polar flow chart bearing time indications of static and differential pressure is integrated to provide digital read outs, both visual and electrical, of the time and static pressure functions as well as a chart index or differential pressure function. Thereafter, the three indexes or digitally represented functions are read out from respective registers in sequence for the energization of a print and/or punch equipment whereupon the data may be programmed for further automatic calculations through a data processing system.

Therefore, it is an object of the present invention to provide an integration system having an analog to digital converter for providing a chart index output as well as two additional pulse generators providing digital output of the time function and static pressure function such that any part of the flow equation can be calculated separately to thus increase the general use of the integrator.

It is further an object of this invention to provide a system which enables calculation of polar flow charts bearing orifice meter indications to derive and store various of the flow characteristics from digital information procured during a single integration of the chart.

It is still further an object of the present invention to provide an integrating and averaging system which provides digital outputs of the several flow chart indexes for application to standard tape input and computer equipment, the time and pressure indexes representing sufficient characteristics for determining any desired flow information.

Finally, it is an object of this invention to provide a polar flow chart integrating system which derives visual read out as well as digital electrical output of three indexes representative of the time function, static pressure function and the differential pressure function.

Other objects and advantages of the invention will be evident from the following detailed description when read in conjunction with the accompanying drawings which illustrate the invention.

Figure 2:
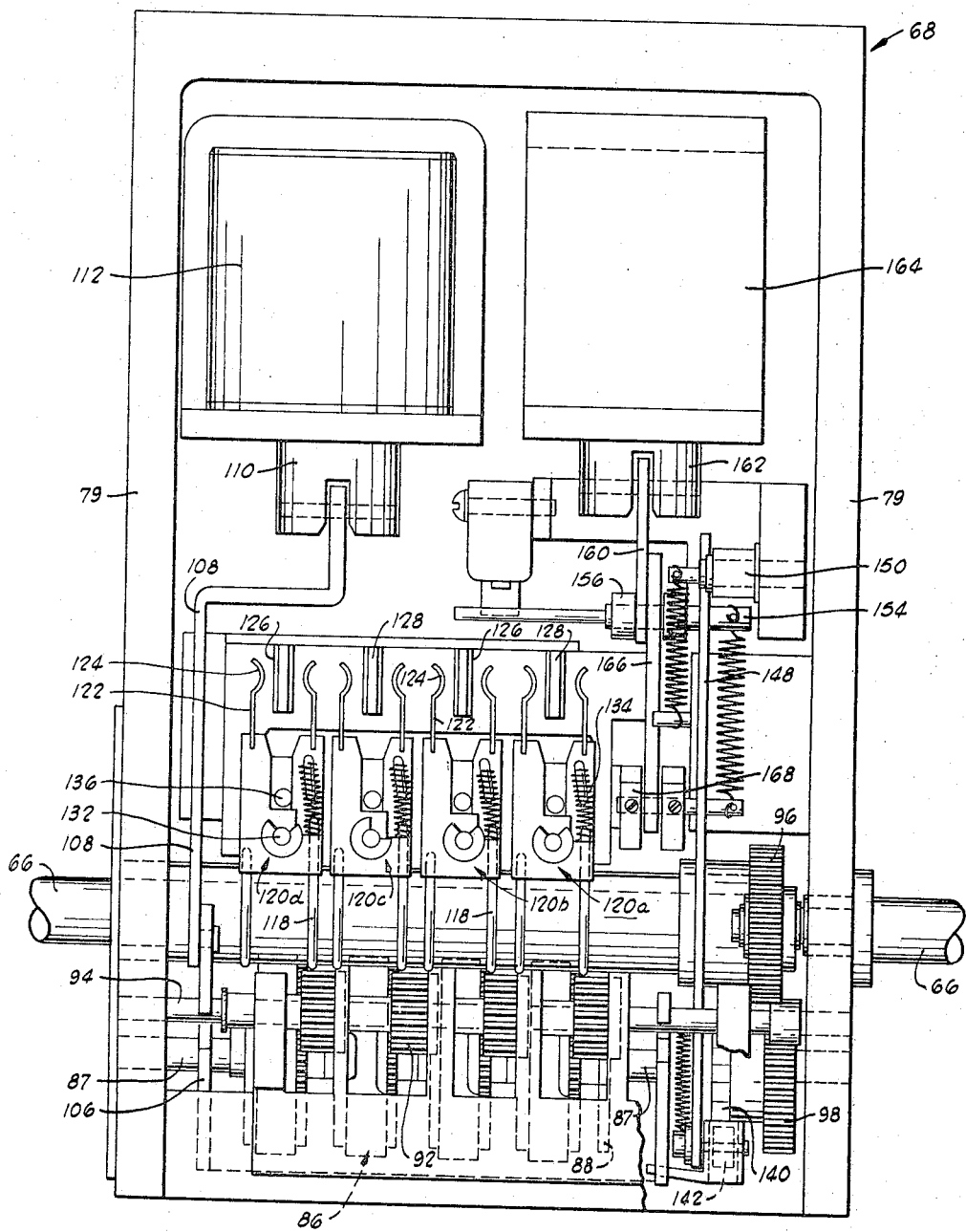
Figure 3:
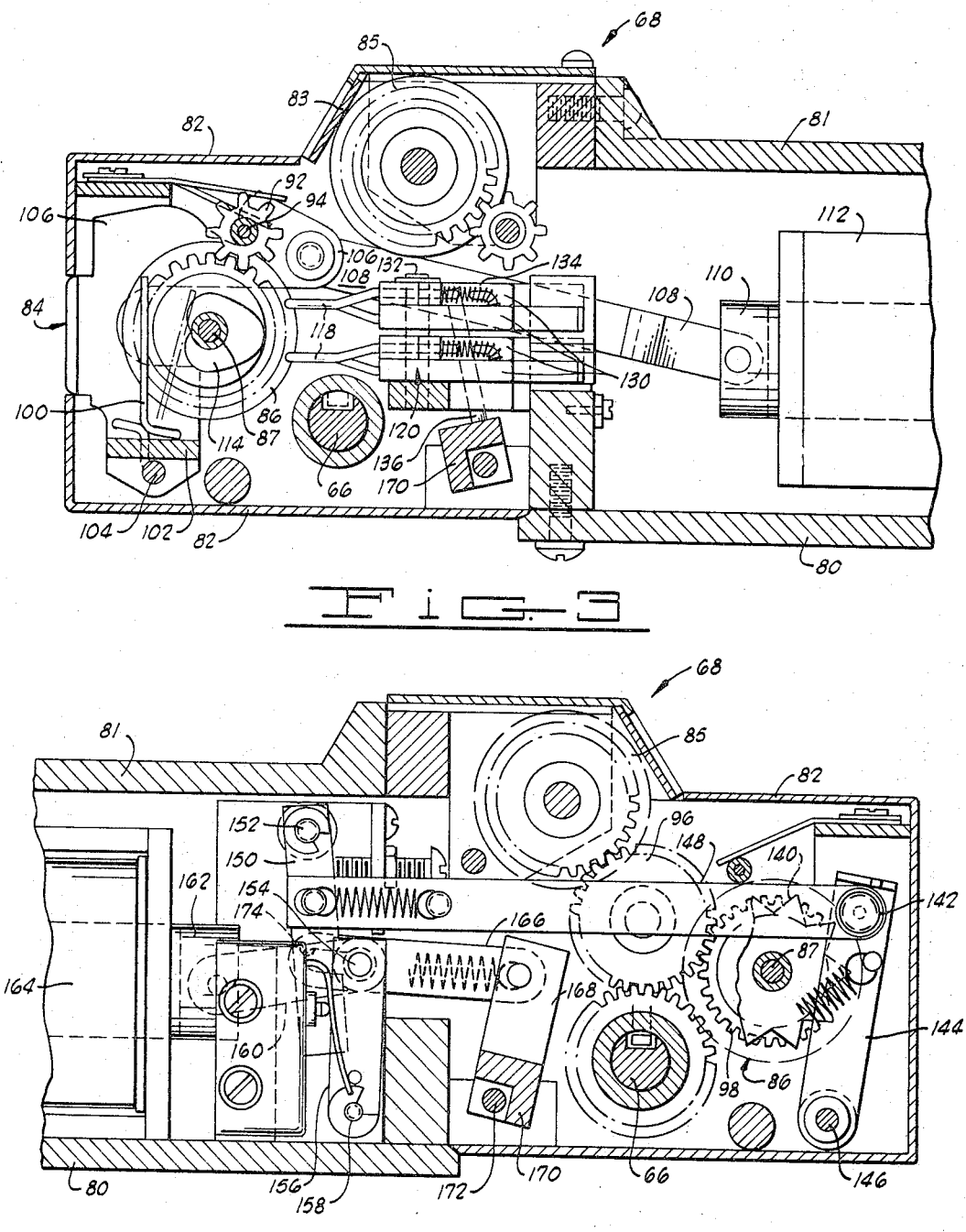
Figure 4:
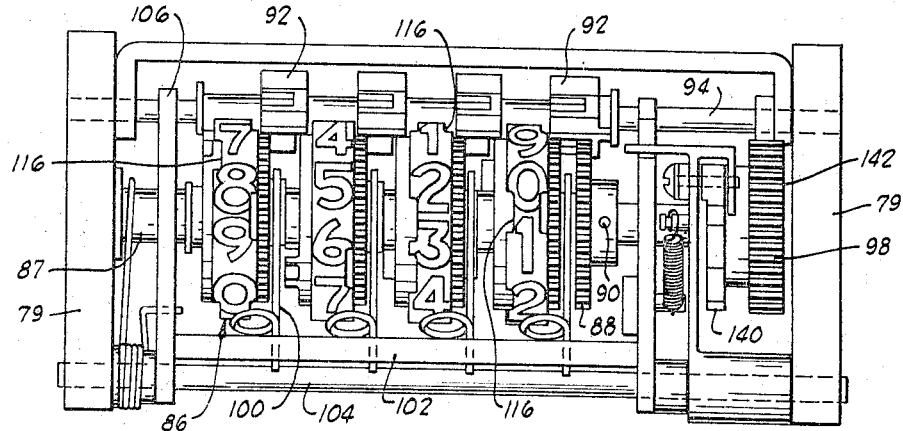
Figures 5, 6:
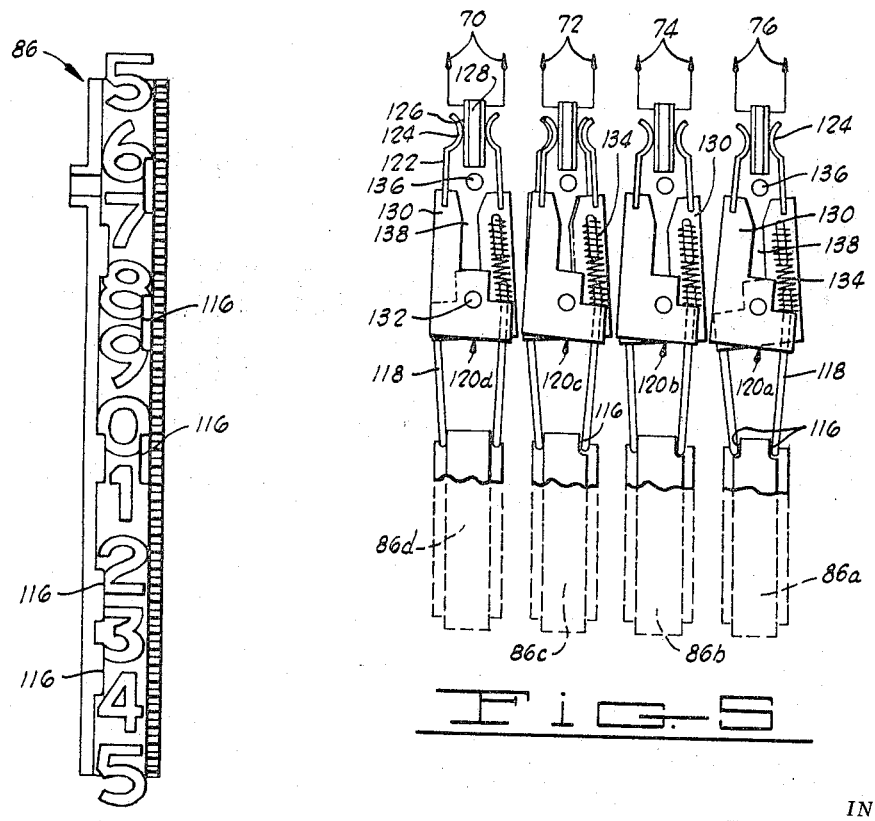
Figure 5:
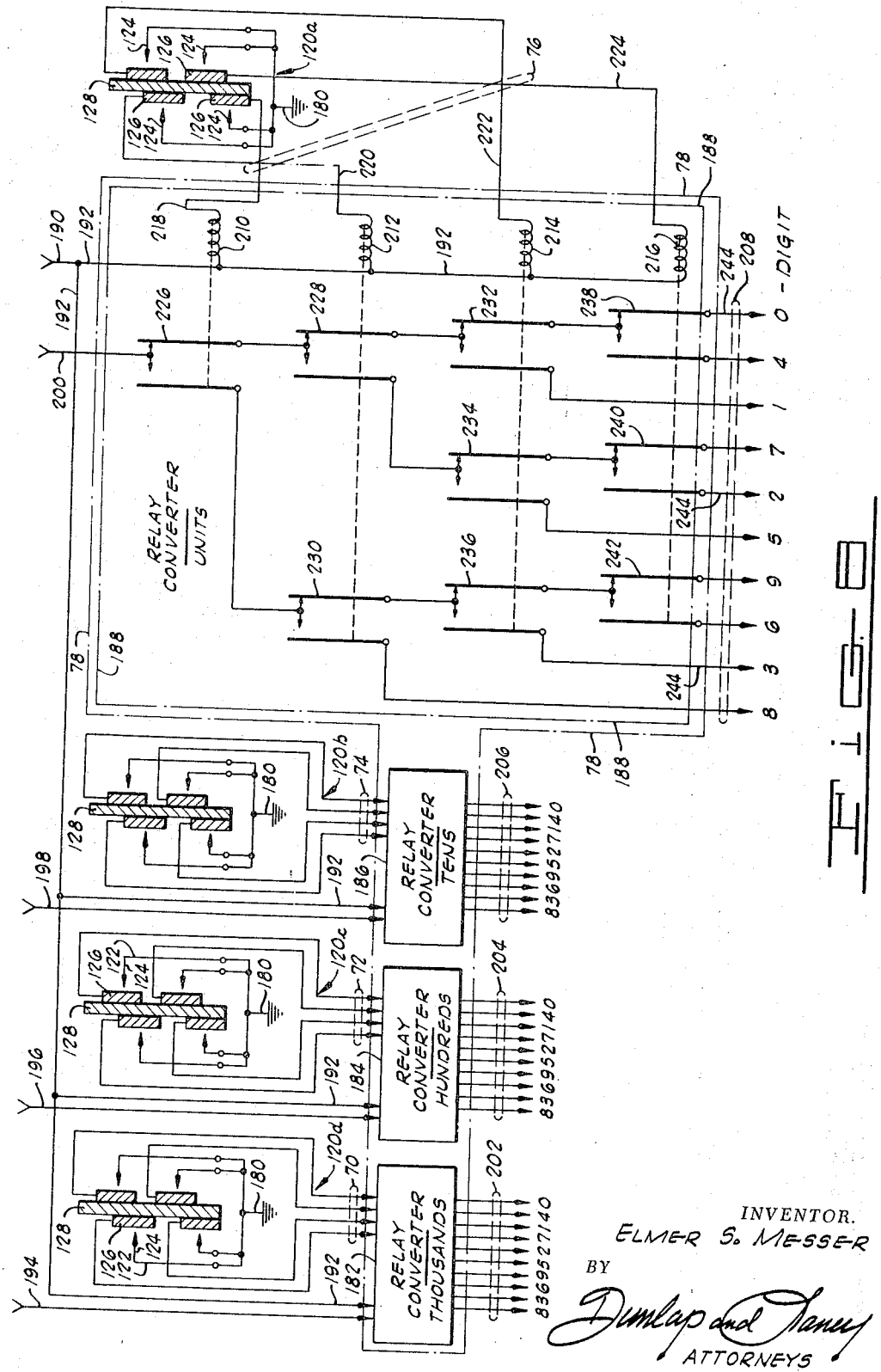
Figure 12:
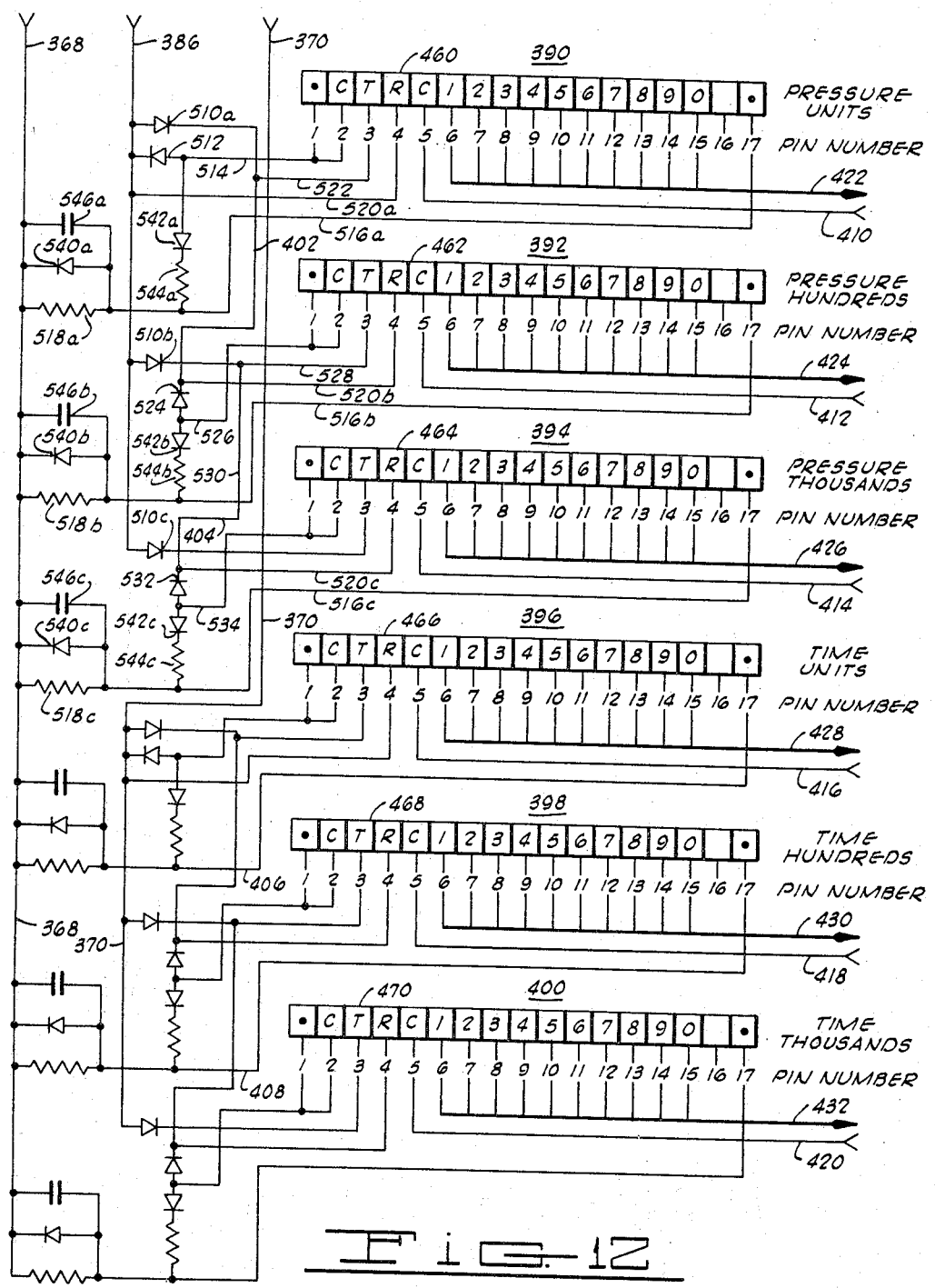

In the drawings:
FIG. 1 is an overall block diagram of the integrating and averaging system;
FIG. 2 is a plan top view of the chart counter mechanism;
FIG. 3 is a vertical sectional view taken along one side of the chart counter mechanism;
FIG. 4 is a front view of the chart counter mechanism showing the digit wheels in detail;
FIG. 5 is a detail view of the switch assembly structure of the chart counter mechanism;
FIG. 6 is a detailed illustration of the digit wheel structure wherein the wheel surface is flattened out to illustrate the entire circumferential surface;
FIG. 7 is a vertical sectional view taken through the side of the chart counter mechanism which is opposite from the sectional view of FIG. 3;
FIG. 8 is a partial schematic diagram of the chart counter switching assemblies and respective relay converters;
FIG. 9 is a plan view in partial vertical section of the pressure pulser assembly;
FIG. 10 is a plan view of the timer pulser assembly;
FIG. 11 is a schematic diagram of the time and pressure pulse control circuitry;
FIG. 12 is a schematic diagram of the pulse driver circuit which is utilized to supply the time index register and the pressure index register;
FIG. 13 is a schematic diagram of a single pulse register unit;
FIG. 14 is a partial schematic diagram of the scanning circuit of the system; and
FIG. 15 is a schematic diagram of the master control network of the integrating and averaging system.

The description proceeds with reference to FIG. 1, an overall system block diagram, with noted reference to other figures pertaining to selected subassemblies. A dash line 20 outlines a basic integrator for use in calculating polar flow charts, particularly flow charts transcribed in response to orifice metering indications. The integrator 20 is well known and is the particular subject matter of U.S. Patent No. 2,773,642, entitled "Integrator," in the name of J. B. McGay et al., and assigned to the present assignee, and U.S. Patent No. 3,161,355, entitled "Integrator and Counter Means Therefor," in the name of E. S. Messer, and assigned to the present assignee.

The integrator 20 consists of a drive motor 22, the primary movement source, supplying rotational input on a shaft 24 to a gear box 26 which supplies further rotational output at predetermined ratios (to be described) on shafts 28 and 30. The output shaft 28 transmits rotational motion through a worm drive assembly 22 to a drive spindle 34 thereby rotating a chart plate 36. The output shaft 30 from gear box 26 is connected to rotate a time plate 38. A polar flow chart can be secured on the chart plate 36, whereupon a static pressure stylus 40 and a differential pressure stylus 42 can be individually operated to follow the rotational indications on the polar flow chart. The static stylus 40 is connected through a suitable linkage 44 and a square root linkage 46 to axially adjust an idler wheel or static roller 48 supported by a linkage 50. Similarly, the differential stylus 42 connects through a linkage 52, square root linkage 54, and a support link 56 to another axially movable idler wheel, a differential roller 58.

A pressure plate 60 is rotationally supported by a stub or shaft 62 which is suitably secured so that the pressure plate 60 rests upon and receives rotary motion from the static roller 48, the differential roller 58 also being positioned to rest upon and receive motion from the pressure plate 60. Hence, primary drive on shaft 30 to time plate 38 is transmitted through static roller 48 to the pressure plate 60 and, finally, to the differential roller 58.

Since the static roller 48 receives its drive motion along the radius of time plate 38 at a point controlled by the static stylus 40 and square root linkage 46, the revolution count made by the static roller 48 is a digital equivalent to the product of time and the square root of static pressure. The pressure plate 60 acts as an idler and is rotated only by the static roller 48, such that its rotation is also a digital equivalent of the product of time and the square root of static pressure. Hence, the position of pressure plate 60 with reference to the time plate 30 permits the addition of a constant to be made to the static pressure. A constant equivalent to atmospheric pressure is set in by offsetting the center line of pressure plate 60 from the center line of time plate 38 by a selected distance, as represented by the arrow 64. Thus, after such offset adjustment (arrow 64), the number of rotations which the pressure plate 60 makes is a digital equivalent to the product of time and the square root of absolute static pressure.

The differential roller 58 is driven by the pressure plate 60 and the number of revolutions which it makes for each pressure plate 60 revolution depends upon its radial position. Thus, variation in the differential stylus 42 through square root linkage 54 varies the radial position of differential roller 58 along the pressure plate 60, the revolutions of differential roller 58 being proportionable to flow volume, the product of time and the square roots of absolute static pressure and differential pressure. Various rotational ratios may be set into the integrator 20 as a matter of design, but an exemplary proportioning would be such that the time plate 38 makes 154 revolutions for every 77 revolutions of output shaft 28 which, through worm gear drive 32, drives the chart plate 36 one revolution.

The revolutions of differential roller 58, a flow volume indication, are directly transmitted via a linkage 66 to a chart index counter 68. Chart index counter 68 is a four-digit counter which provides visual indication as well as electrical indication for each digit on each of the cables 70, 72, 74 and 76 (as will be further described). The electrical digit indications on leads 70–76 are then applied to a digital code converter 78; whereupon each electrical signal is converted to a proper digital electrical signal, also to be further described.

Referring now to FIGS. 2, 3 and 4, the chart index counter 68 has a U-shaped body member 79 making up three walls of the assembly. As shown in FIG. 3, a bottom panel 80 and top panel 81 are suitably fastened to enclose the counting assembly while a contoured, generally U-shaped enclosure member 82 is formed to fit over the front of the body member 79 to complete the sealing of the assembly. The forward enclosure 82 includes a pair of suitably sealed and protected viewing openings 83 and 84 for viewing digital registrations on two sets of digit wheels 85 and 86. The digit wheels 85 tally a four place totalizing count in well-known manner. The digit wheels 86, also a four place digital register, constitute the chart index register and embody resetting and binary coding mechanism as will be further described.

The chart counter digit wheels 86 are mounted on a shaft 87 which is journaled on the opposite side walls of the body member 79 of the counter assembly. A gear 88, parallel to the units wheel or the right hand digit wheel 86, is tied to the associated shaft 87 by means of a set screw 90. The remaining digit wheels 86 are adapted to be stepped in decimal relationship in well known manner by means of the small gears 92 which are mounted on a shaft 94 journaled in the side walls 79. A more complete explanation of indexing means of this nature is provided in applicant's aforementioned U.S. Patent 3,161,355. Thus, in a manner well known in the mechanical art, a complete revolution of the units wheel effects a one digit movement of the tens wheel, likewise, a complete revolution of the tens wheel initiates a one digit movement of the hundreds wheel, etc.

Rotational input to the chart index counter 68 is supplied on the shaft 66 from the differential roller 58 (FIG. 1). Rotation of the main drive shaft 66 is transmitted through an idler gear 96 to a gear 98 which is affixed to rotate the shaft 87. Thus, both sets of the digit wheels 85 and 86 are rotated in accordance with the rotation of the main drive shaft 66. Digit wheels 85, which may record a continuous or totalizing count, are not necessarily an integral part of apparatus comprising the present invention but may be employed to advantage in their intended manner. It is also necessary to provide for resetting of the digit wheels 86 to their zero position after a set of previously represented values have been reported or otherwise dispensed with. Resetting of the wheels 86 is accomplished by means of a plurality of spring fingers 100 (FIGS. 3 and 4) which are mounted on a transverse bar 102, the bar being pivotally connected to a transverse rod 104. An arm 106 extends upwardly of the bar and then inwardly within the counter housing where it connects with a link 108 which in turn is connected to the movable core 110 of a reset solenoid 112.

Each of the fingers 100 is adapted to be brought into engagement with a heart-shaped portion 114 which is formed in one side-face of each of the digit wheels 86. Thus, the fingers 100 ride in a cam-like face on each of the respective heart-shaped portions 114. This flat edge is positioned such that zero digits on the wheels will be exposed through the viewing opening 84 when the reset solenoid 112 is energized. Solenoid 112 causes the fingers 100 to press against the heart-shaped portions 114 thereby forcing each to the position as shown in FIG. 3.

In addition to visual read out of the chart index information, the counter assembly 68 provides means for generating electrical signals such that the displayed digits on the digit wheels 86 can be remotely identified or otherwise recorded. Such electrical read-out is accomplished by providing a plurality of recesses 116 about the entire periphery and on both sides of each of the digit wheels 86. A plurality of contact fingers 118 extend from each of a plurality of pivotally movable switch assemblies 120a, b, c and d, and the fingers 118 are adapted to be received within the recesses 116 when the assemblies 120a–d are allowed to pivot in a manner to be described. A plurality of contact arms 122, extensions of respective fingers 118, each extend outwardly from the inward ends of the switch assemblies 120a–d, and these contact arms are provided with curves contacting portions 124 which engage conductive plates or surfaces 126, formed on each side of a plurality of contact supports 128.

FIG. 5 illustrates the electrical coded arrangement to better advantage. Each one of the four switching assemblies 120 is comprised of four individually pivotal members 130 which are stacked, alternately opposite in orientation, and each secured by a pivot post 132 (see also FIG. 3). Each of the pivotal members 130 has a contacting arm 118 which can be brought into contact with one side or the other of the digit wheels 86. The contacting arms 118 are bent as shown in FIG. 3 so that the upper two opposed arms and the lower two opposed arms will contact the digit wheels 86 at proper levels. The other ends of each of the pivotal members 130 extend a contact 122 and contacting surface 124 for completing a circuit through one of contacts 126, two of which are mounted in properly spaced relationship on each side of the contact support 128. Electrical leads, four-wire groups 70, 72, 74 and 76, are then provided from each of the contact supports 128 for connection to the electrical control circuitry as will be further described below.

The pivotal members 130 are biased by means of conductive spring members 134, such that each pivotal member 130 of the upper and lower pairs is biased against its counterpart. Thus, it can be seen that each of the contacting arms 118 is continually urged inwardly and, if permitted, by the presence of a recess 116 in digit wheel 86, the contacting arm 122 and contacting surface 124 will be urged inwardly upon the countacts 126 of contact support 128.

The pin members 136 serve to disable the electrical contacting circuitry, as during a chart index count procedure. Thus, by a relay action to be described, the pins 136 can be urged up into the spaces 138 thereby spreading the pivotal members 130 and their respective arms 118 and contacts 122 (see FIG. 2 for the chart count attitude). A relay actuation, to be described, then withdraws the spacing pins 136 to enable an electrical reading.

FIG. 6 shows an exemplary peripheral view of a digit wheel 86 in the manner in which recesses 116 are defined on each side of the wheel. The coding arrangement as set forth herein is binary, fourth switch closure combinations enabling the coverage of ten digital values. It should be understood however that other code combinations may be selected as a matter of choice. Referring again to FIG. 5, the manner and combination of switch closures can be noted to better advantage. The right hand digit wheel 86a is in a position whereby each of the arms 118 associated with this wheel is received within a recess 116. Accordingly, each of the contact portions 124 engages one of the conatcts 126 whereby four circuits will be completed through conductors 76. The next digit wheel 86b is positioned whereby two of the arms 118 are received in a recess 116 while the two arms on the opposite side of the wheel are not received in a recess 116. Accordingly, only two of the contact portions 124 will have engaged a contact 126 and only two electrical circuits of the group 74 will be closed. The third digit wheel 86c also provides for closing of only two circuits; however, in this case a contact portion 126 on each side of the support 128 is engaged. The left hand digit wheel 86d is positioned whereby none of the arms 118 are received in a recess, and accordingly, all of the contact portions 124 are maintained out of engagement with their respective contacts 126.

In the illustrated embodiment, the arms 118 are located behind the digit wheels 86 and, accordingly, the combination of recesses 116 for the numeral displayed through the visual opening 84 is actually located in a diametrically opposite position. It will be appreciated, however, that the fingers can be located in any desired position relative to the symbol being displayed and the combination of recesses will be positioned according to the relationship between the arms 118 and the symbols displayed.

The counter assembly 68 also embodies a measure whereby the digit wheels 86 are properly aligned prior to movement of the arms 118 so that a reading cannot be taken when one or more of the digit wheels 86 is out of its properly aligned position. Referring to FIG. 7, this is accomplished by means of a star wheel 140 which is affixed to rotate with the shaft 87. A roller 142 is mounted on a pivotal bar 144 which, in turn, is connected at a pivot point 146 to the side wall of body member 79. A link 148 is connected to the bar 144 adjacent the roller 142 and this link is in turn connected to a bar 150 which is previously mounted at 152. When the link 148 is moved rearwardly, the roller 142 will engage the teeth of star wheel 140 and settle between two of the teeth. Movement of the star wheel 140, which is effected by the roller 142 will, in turn, move the shaft 87 to thereby move at least the units digit wheel 86. The star wheel 140 is so positioned that the roller 142 will always properly align the digit wheels 86 if these wheels are out of position when the link 148 is drawn to the rear.

The operation of the link 148 is tied in with movement of the contacting arms 118 such that the digit wheels 86 will always be properly aligned before the arms 118 seek the recess 116. The bar 150 which operates the link 148 is moved by means of a pin 154 which is connected to a bifurcated member 156. This member 156 is pivoted at 158 and is connected by means of a link 160 to the moveable core 162 of a code solenoid 164. Accordingly, when the code solenoid 164 is energized, the pin 154 will engage the bar 150 to effect movement of the link 148.

A link 166 is also connected to the bifurcated member 156 and this link extends to a second bifurcated member 168. This second bifurcated member 168 is integral with a laterally extending bar 170 which is pivotally connected at 172 between the side walls of the mechanism. The pins 136 (FIGS. 2, 3 and 5) extend upwardly from the bar 170 into position between each of the switch assemblies 120a, b, c and d to control the electrical contacting mechanism. Accordingly, when the solenoid 164 is energized, the bar 170 will be pivoted whereby the pins 136 will be moved rearward, to the position shown in FIG. 5, to permit movement of the arms 118 into contact with the recesses 116 of digit wheels 84. A slot 174 is formed in the link 166 to provide a time delay between the movement of the link 148 and the link 166.

The electrical switching interconnections between the chart index counter 68 via cables 70, 72, 74 and 76 to the digital code converter 78 (FIG. 1), are shown in FIG. 8. Each of the digit wheels 86a–86d (FIG. 5) causes predetermined actuation of respective code switching assemblies 120a, 120b, 120c and 120d. Each of the code switching assemblies 120a–d is shown schematically as consisting of the contact support 128 clad with four contact surfaces 126, two on each side in staggered relationship and in alignment with their respective contacts 122 and contact portions 124 (FIG. 5). Each of the four code switching assemblies 120a–120d may have its respective contact members 124 connected to ground or other common conductor, denoted generally by 180. Each of the four contact surfaces 126 for each code switching assembly 120a–120d is connected via the four-wire conductors 70, 72, 74 and 76 to each of four relay converters 182, 184, 186 and 188 within the digital code converter 78 (dashed line 78).

A relay energizing power source of 6 volts A-C is applied at input 190 and distributed on the leads 192 to each of the relay converters 182–188. Further power input, a print voltage supply, is applied at each of the leads 194, 196, 198 and 200 for distribution to the respective relay converters 182, 184, 186 and 188. During a scanning interval, both the print power input on leads 194–200 and the code switching application on leads 192 are enabled to allow an output (a digital representation) on the appropriate lead of the respective cables 202, 204, 206 and 208 for subsequent input to the terminal printing apparatus as will be further described.

Since the relay selection circuitry for the relay converters 188, 186, 184 and 182 are identical, detailed circuit description is only set forth for the units relay converter 188. The converter comprises four relays 210, 212, 214 and 216, each having one end connected to the 6 volt A-C input on lead 192 and having their respective opposite ends connected to leads 218, 220, 222, and 224 of four-wire cable 76, each wire being connected to one of the contact surfaces 126 at the code switching assembly 120a (see FIG. 5). The relay 210, responsive to the appropriate switch closure at code switch assembly 120a, can be energized to reverse the contacts 226. Similarly, the relay 212 when energized will reverse contacts 228 and 230 while relay 214 controls contacts 232, 234 and 236, and relay 216 controls contacts 238, 240 and 242. Thus, it can be seen that by certain combinations of switch closures (contacts 124 and contacting surfaces 126) at the code switching assembly 120a, preset ones of relays 210–216 can be energized to allow conduction of the print voltage supply input at lead 200 through the relay converter 188 to a proper output lead 244 in the cable 208. That is, one of the leads 244 can be selectively energized to thereby represent a selected digit as indicated. The relay coding and order is a matter of choice; however, the exemplary digital switching arrangement is as follows:

| Digital Indication | Relay 210 | Relay 212 | Relay 214 | Relay 216 |
|---|---|---|---|---|
| 1 | | | Closed | Closed. |
| 2 | | Closed | | Do. |
| 3 | Closed | | Closed | Do. |
| 4 | | | | Do. |
| 5 | | | Closed | Closed |
| 6 | Closed | Closed | | |
| 7 | | Closed | | |
| 8 | Closed | | | |
| 9 | | do | | |
| 0 | | | | |

Referring again to FIG. 1, it can be seen that two additional digital equivalent indications are produced from the integrator mechanism 20. A pressure pulser 250, energized by rotation on a shaft or linkage 252 from a roller 254, provides a digital electrical output on lead 256 to the pressure pulse control 258. Also, a time pulser 260 receives rotation from a drive gear 262, secured on main output shaft 28, through a drive gear system, shown generally as gear 264, and shaft 265 to provide a digital electrical output on lead 266 to the time pulse control 268. The gear ratio between drive gears 262 and system 264 can be selected in accordance with the controlling constants within the system and, similarly, the radial positioning of pressure roller 254 upon the pressure plate 60 can be adjusted to any suitable rotational factor of the true time and static pressure product. By making possible a great many variations in digital values the setting of overall machine constants is greatly amplified.

Referring now to FIG. 9, the pressure pulser 250 is shown in greater detail. The pressure roller 254, receiving rotational drive from pressure plate 60 (FIG. 1), is secured to a mounting collar 266 which is affixed to the input shaft 252. Input shaft 252 is maintained in rotatable connection to an electromagnetic clutch-brake assembly 270. The clutch-brake assembly 270 is one of the commercially available types and is secured in a casing 272 to transmit input rotation from shaft 268 to the output shaft 274 upon energization, as will be further described. A permanent magnet 276, suitably retained within a collar 278, is secured for rotation with the output shaft 274.

An end cap 280 is fastened upon the casing 272 to enclose the rotatable permanent magnet 278 while positioning the magnetically responsive reed switch contacts 282 and 284 within the magnetic field. Thus, when the electromagnetic clutch-brake 270 is energized and output shaft 274 is rotational, the dry reed switch contacts 282 and 284 will be normally open when the field flux of the magnet is perpendicular, ninety degrees of rotation placing the magnetic field in line with the reed switch to close the contacts 282 and 284. Thus, with continuous rotation of the permanent magnet 276, an electrical circuit is completed every 180° of rotation of the static pressure roller 254 and the rotation becomes a digital number as generated by the switch closures between leads 286 and 288 from terminals 290 and 292 of the dry reed contacts 284 and 282.

The time pulser 260 is similar to the pressure pulser 250 and is shown in greater detail in FIG. 10. The drive gear 262 transmits primary rotation from main drive shaft 28 to the gear system 264. Gear system 264 consists of an idler shaft 294 receiving rotation through gear 296 from drive gear 262 and transmitting rotation on a larger idler gear 298. The idler gear 298 is in engagement with a drive gear 300 which supplies rotational motion to the input shaft 264 of the time pulser assembly 260. The input rotation on shaft 302 is continually applied to a conventional electromagnetic clutch-brake assembly 304, which, when energized, transmits the rotation via the output shaft 306. Output shaft 306 carries a permanent magnet 308 as secured by a suitable bushing or collar member 310.

A dry reed switch, comprising reed contacts 312 and 314, is secured within the magnetic field of permanent magnet 308 so that rotation of the magnet will effect intermittent closure of the reed switch contacts 312 and 314. The switch closure indications, a digital representation of the system time function, is then present between leads 316 and 318 (line 266 of FIG. 1) to the time pulse control 268. The rotational ratio between the main output shaft 28 and the digital pulse code is a matter of choice depending upon the required accuracy and resolution of the system. For example, the time function gear system 264 can be designed to permit 768 pulses to be made for every 77 revolutions of the input gear 262. Since 77 revolutions of the main drive shaft 28 represents one rotation of the chart plate 36, it also conveys twenty-four hours of elapsed time in the gas flow equation. Hence, a total digital count of 768 will represent twenty-four hours in flow time.

FIG. 11 shows, in schematic form, the pressure pulse control 258 and the time pulse control 268 wherein the respective time and pressure switch closure indications on lead pairs 256 and 266 are utilized to form proper time and pressure pulses. The pulse control network of FIG. 11 is energized by a 22.5 volts A-C input on leads 320 and 322. The energizing voltage on leads 320 and 322. The energizing voltage on leads 320 and 322 is obtained from a step-down transformer which is energized in the master control network as will be further described. Input leads 320 and 322 are connected to supply the A-C voltage to a full wave rectifier 324 which provides a positive output at point 326 to lead 328, the negative or return of the D-C supply being on lead 330 to bridge point 332. The D-C supply across leads 328 and 330 is filtered by a suitable capacitor 334 and resistor 336, on the order of one megohm.

As denoted by the dash-line 338, the electromagnetic clutch coils, actually situated in the pressure pulser 250 and time pulser 260 (FIGS. 9 and 10), are energized by the D-C supply from rectifier 324. The time clutch coil 340 is connected in series with a limiting resistor 342 and switching circuitry between the leads 328 and 330 and, similarly, a pressure clutch coil 344 and series-connected limiting resistor 346 are connected in parallel across the D-C supply. The switching circuitry, as controlled from the master control, insures that the clutch coils 340 and 344 will be energized for the proper intervals during operation of the equipment. A zero differential switch 348, a micro-switch responsive to the positioning of the static and differential stylii 40 and 42 (FIG. 1) applies energy to the coils 340 and 344 only when there is some differential pressure reading upon the chart, i.e., a reading other than zero. Contact 4A of Relay 4, contact 1A of Relay 1 and contact 7B of Relay 7, shown in their normal positions, are actuated by energization of their respective control relays 1, 4 and 7 in the master control (to be described).

Thus, when the time clutch coil 340 and the pressure clutch coil 344 are energized, there will be switch closure indications, digital representations of time and pressure, present on the lead pairs 266 and 256. A switch closure shorting leads 316 and 318 (lead pair 266) provides D-C power between leads 328 and 330 through the relay coil 350, the time relay or Relay 10. A resistor 352 and diode 354 are connected across the switch leads 316 and 318 to insure a concise switch contact. Previous to energization of the time Relay 10, a capacitor 356 connected to the positive D-C lead 328 is charged through a limiting resistor 358 and the Relay 10 contacts 10C from the negative D-C supply lead 330. At the time of energization of time Relay 10, relay contacts 10C are thrown to the opposite position and the capacitor 356 is discharged through relay contacts 10C, lead 360 and a time reed coil 362. The flow of current through time reed coil 362 closes a set of time reed contacts 364, denoted by dash-line 366. Thus, a D-C circuit load between leads 368 and 370 is energized through contacts 5A and 5B of Relay 5, the reset relay, situated in the master control and being shown in its normal or de-activated position. A pair of normally closed relay contacts 2C complete the circuit on the D-C return lead 330. Thus, the flip-flop circuitry comprising the periodically charged capacitor 356 and time reed coil 362 provides a uniform digital pulse output between leads 368 and 370, such circuitry insuring system accuracy and lessening the possibility of damage to the subsequent pulse register circuitry.

A pressure Relay 12 is periodically energized in similar manner by switch closures on leads 286 and 288 (lead pair 256) from the pressure pulser 250 to generate a digital pressure index. A resistor 372 and diode 374 are connected across the switch leads 286 and 288 to effect transient suppression. Thus, a switch closure indication across leads 286 and 288 comprises the D-C circuit from return lead 330 through pressure Relay 12 to the positive D-C lead 328 to reverse the relay contacts 12B. A condenser 376 is periodically charged through contacts 12B and resistor 378 and alternately discharged through a pressure reed coil 380 upon reversal of the relay contacts 12B, energization of Relay 12. The periodic energization of pressure reed coil 380 effects closure of a reed switch 382 (note dash line 384) to complete D-C circuit as between leads 386 and 368, relay contacts 5C and 5A, respectively.

Relay 5, a reset relay energized in the master control as will be described, reverses contacts 5A, B and C to provide half-wave rectified D-C voltage of opposite polarity to respective pulse registers for resetting each to zero. That is, the A-C input at leads 320 and 322 is conducted between leads 390 and 392 for half-wave rectification by a rectifier 394 and the unfiltered rectified voltage is available between leads 390 and 396 to the respective proper contacts of Relay 5.

Referring again to FIG. 1, the common and reset lead 368 is connected between each of the pressure pulse control 258 and the time pulse control 268 to all registers of both the time and pressure pulse registers. That is, the pressure register consisting of a units pulse register 390, a tens pulse register 392 and a hundreds pulse register 394, and the time register consisting of a units pulse register 396, a tens pulse register 398 and hundreds pulse register 400. Digital pulse output from pressure pulse control 258 on lead 386 is applied for count in the units register 390. At every tenth pressure pulse the units register 390 applies a pulse output on lead 402 to advance the tens register 392 one count, and for every ten counts of tens register 392 a pulse is applied on lead 404 to advance the hundreds register 394. Similar decade registration is effected by application of a time pulse on lead 370 to units register 396, leads 406 and 408 conducting decade pulse counts to the respective tens and hundreds registers 398 and 400. Each of the pulse registers 390 through 400 receives print power on the respective leads 410, 412, 414, 416, 418 and 420 which enable a digital output on one of the leads of respective cables 422, 424, 426, 428, 430 and 432 for entry in the tape or punch terminal apparatus as will be further described below.

A scan switch 434 is rotated by a scan motor 436 through linkage 438 to apply print power to the contacts of scan switch 434 in a predetermined sequence. The print power voltage is supplied from a print power supply 440 via lead 442 to the wiper element 444 of scan switch 434. Thus, when a scan sequence is initiated, the scan switch 434 applies print power in sequence on each of the leads 194–200 to the digital code converter 78 and on each of leads 410–420 to the respective pulse registers 390–400. Thus, the respective digital indications of the chart index, pressure index and time index can be interrogated and printed in the terminal equipment. Each of the output cables 202–208 and 422–432 (denoted by heavy lines) comprises a plural conductor cable, one conductor for each digit represented, and all common digit conductors are connected in parallel to the input 448 for digital entry to the print/punch assembly 450.

FIG. 12 illustrates the driver circuitry for pulse registers 390–400 in greater detail. The common or reset lead 368 from pulse controls 258 and 268 is supplied to each of the pulse registers 390 through 400. Digital pulses are conducted on lead 386 from the pressure pulse control 258 to the respective pulse registers 390, 392 and 394 which register units, hundreds and thousandths, respectively, of the pressure index. Similarly, the digital time pulses are conducted on lead 370 from time pulse control 268 to each of the units, hundreds and thousands time registers 396, 398 and 400. The actual pulse registers 390 through 400 are not shown in FIG. 12 but they are shown in relation to their respective seventeen pin receptacles 460, 462, 464, 466, 468 and 470. Each of the pulse registers 390 through 400 then would consist of a pulser plug-in unit as shown in FIG. 13. Such pulser assemblies are commercially available and, in general, they consist of a suitable sealed enclosure 472 (FIG. 13) which includes a molded base member and a configuration of contact pins 474. The assembly is operated via pin Nos. 1 and 17 and leads 476 and 478 which energize a stepping coil 480. The stepping coil 480 is then connected through a suitable magneto-mechanical linkage 482 to effect step-wise movement of rotary wiper elements 484 and 486 of the respective circular switch assemblies 488 and 490. Each of the switch assemblies 488 and 490 has ten equally spaced contacts 492 and 494, respectively.

The switch assembly 488 comprises the control switch assembly of the pulse register unit and it is usual to include rotary means moved in synchronism with the rotary wiper element 484 to provide a visual read out to the operator. The contacts 492 for digital Nos. 1 through 8 are shorted together by a connector 496 which is connected by leads 498 to the plug pin No. 4 of pins 474. The digital contact No. 9 of switch 488 is connected via lead 500 to plug pin No. 3, while the rotary wiper element 484 and the zero digit contact are connected through lead 502 to the No. 2 plug pin. These interconnections provide the feedback control through the pulse driver circuit to subsequent pulse registers for the purposes of decade registration and reset as will be further described. The plug pins Nos. 6 through 15 are each connected through leads 504 to respective ones of the digital contacts of switch assembly 490 as denoted by the digital numbers. A common lead 506 interconnects the rotary wiper element 486 with the plug pin No. 5 of pins 474. Thus, depending upon the rotary position of switch assembly 490, a circuit will be completed between one of the digital contacts, plug pins Nos. 6 through 15, and the common lead 506 to plug pin No. 5.

Referring again to FIG. 12, it can be seen that when a pulser assembly, such as shown in FIG. 13, is inserted in each of the sockets or receptacles 460 through 470, print power (90 volts D-C) will be received into plug pin No. 5 of each register via leads 410 through 420 and, after conduction through a switch assembly representative of a particular digital indication, the print power output will be present on one of the digital output leads, plug pins Nos. 6 through 15, through the respective plural conductor cables 422 through 432 for entry to the print/punch assembly 450.

The pulse register assemblies 390 through 400 are actuated by means of digital pulse inputs on leads 386 and 370, conduction return being through lead 368. Thus, a digital pressure indication is controlled by pulse input between leads 368 and 386, lead 368 being a positive polarity and connected to the bridge rectifier 324 (FIG. 11) while the lead 386 is intermittently connected to the negative output side of bridge rectifier 324 through the action of the pressure reed switch 382 (FIG. 11). The periodic negative pulse on lead 386 is blocked by diodes 510a, b and c (FIG. 12) but finds a conductive path through the oppositely polarized diode 512 and lead 514 to the coil pin No. 1 and control pin No. 2 of the units pressure register 390. The circuit is completed through the stepping coil (FIG. 13), pin No. 17 and lead 516 (FIG. 12) through a limiting resistance 518a for return via the lead 368.

The application of a pulse through the previously described circuit energizes the stepping coil 480 (FIG. 13) to advance the control and digit switches 488 and 490 one unit. This completes the circuit from the print power input lead 410 (FIG. 1) through the pin No. 5 and the pulse register common or wiper element 486 (FIG. 13) to one of the digital output connections at pins Nos. 6 through 15 for conduction through cable 422 (FIG. 12). In the control switch 488 (FIG. 13) the pulse input on lead 514 (FIG. 12) to pin No. 2 will be conducted to the wiper element 484 and to the "R" or reset lead 498 (FIG. 13) to pin No. 4 and lead 520a (FIG. 12) back to the input lead 386 to effect no circuit change. However, if the pressure units register 390 had been previously on the nine digit position, wiper element 484 connected to transfer lead 500 and pin No. 3 (FIG. 13), a pulse would be present on lead 522 (FIG. 12) to lead 402 and through a diode 524 and lead 526 to the pins Nos. 1 and 2 to actuate the hundreds pressure register 392. Thus, each time a ten count is taken in one of the pulse registers, a single pulse output is provided to the succeeding register to advance it one digit. The similar transfer connection exists between pulse register 392 and the thousands pressure register 394. That is, a transfer pulse occurring at pin No. 3 is conducted on a lead 528 to lead 520 through a diode 532 and lead 534 to the coil energizing pin No. 1 and the control pin No. 2 of the pulse register 394.

During reset, as will be noted in FIG 11, the Relay 5 is energized to throw contacts 5A, B and C to their other positions, thus placing a half-wave rectified voltage of opposite polarity between leads 368 and 386 to each of the pressure pulse registers 390, 392 and 394 The rectified positive peaks are applied on lead 386 through diodes 510a, b and c (FIG 12) to the respective transfer pins No. 3 of pulse registers 390, 392 and 394 such that if a register is on its nine digit position (see FIG 13), the reset pulse will be conducted through the control pin No. 2 to pin No. 1 and through the respective pulse register coil to pin No. 17 for return along leads 516a, b and c (FIG. 12) through respective diodes 540a, b and c to lead 368. A parallel path is also supplied to each register in the event that the digital contact is other than the position for numeral nine or zero. Thus, the rectified positive voltage pulses (60 cycle half-wave) are conducted from lead 386 through lead 520 to the reset pin No. 4 of pulse register 390 through the control pin No. 2 to the pin No. 1 with subsequent stepping coil energization and return through pin No. 17 and lead 516a. A set of series connected diodes 542a, b and c and resistors 544a, b and c are connected across the reset voltage supply in a bias-limiting arrangement. Capacitors 546a, b and c are provided in each of the return networks to provide sharp pulse cut-off during stepping energization of the pulse registers.

The pulsing and reset of pulse registers 396, 398 and 400, which indicate the units, hundreds and thousands respectively of the time index, is identical to that described above for the pressure index. A negative pulse, the digital index indication, is received on lead 370 from the time pulse control 268 (FIGS. 1 and 11) to control the stepwise digital register at the respective time pulse registers 396, 398 and 400. Return of the energizing pulse circuitry is through the lead 368 to the positive side of the bridge rectifier 324 in the pulse controls (see FIG. 11). Also, reset is effected in the same manner and simultaneously with reset of the pressure registers as previously described.

It should be readily apparent then that after the operation of the chart integrator 20 (FIG. 1) through a predetermined integration interval, the desired chart index, pressure index and time index will have been computed and indicated upon the respective chart index counter 68, pressure pulse registers 390, 392 and 394, and the time pulse registers 396, 398 and 400. The scan switch 434 can then be activated to sequentially read out the respective digital values of each of the indexes to conduct print power via a proper conductor for causing the correct digital print out at the terminal apparatus, print/punch assembly 450.

The scanning circuitry of the invention is illustrated in greater detail in FIG. 14. The print power, 90 volts D-C, is obtained on lead 442 and a common lead 550 from the master control, to be further described. Also, A-C line voltage is supplied from the master control via leads 552 and 554 to a step-down transformer 556 which supplies a six-volt A-C output between leads 558 and 560 for application in the relay code converters (FIG. 8) as will be described. The scan motor 436 is energized at proper times from the master control to initiate rotation of the scan switch 434, whereby the print power input on lead 442 is applied through wiper element 444 in sequence to the scan switch contacts, thus energizing the relay converters and pressure and time pulse registers to print out their respective digits.

When scan motor 436 is first energized, the wiper element 444 contacts scan switch contact No. 2 to provide 90 volts D-C on a lead 562 to energize Relay 8, the motor control relay, with return to the common lead 550. Energization of Relay 8 closes the holding contact 8A obtaining 90 volts D-C from a lead 564 so that the start Relay 8 remains energized throughout the continuance of the scan. A second set of Relay 8 contacts 8B are also closed to prepare Relay 6 for its "motor stop" function upon completion of the scan. Relay 8 insures that all subsequent contacts of the scan switch 434 will be closed in the proper direction or sequence.

As the scan sequence proceeds, print power from input lead 442 through rotary wiper 444 is applied to scan switch contact No. 4 and then via lead 194 to the thousands relay converter 182. As shown in FIG. 8, one lead of the plural conductor cable 202 will carry a print energy output in accordance with the relay actuation as controlled through the leads 70 from the code switch assembly 120d (see also FIGS. 2 and 5). As the integration sequence continues, the scan switch contacts Nos. 5, 6 and 7 will sequentially supply print power on leads 196, 198 and 200 to sequentially enable a digital recording output on the appropriate leads of cables 204, 206 and 208, in accordance with digital registry of the relay converters 184, 186 and 188. The code relays within each of the relay converters 182 through 188 are connected through leads 192 and 560 to the six-volt A-C source at transformer 556, energization of the respective relays occurring upon completion of a circuit through the respective four-conductor cables 70, 72, 74 and 76 (FIG. 8) to the code switch assemblies 120a, b, c and d. The six-volt A-C source is enabled by closure of relay contacts 8C and 2B (in the master control) and indicated by a chart print lamp 568.

Continued rotation of the scan switch 434 supplies print power at input lead 442 through the rotary wiper 444 to the scan switch contacts Nos. 8, 9 and 10 which supply print power to integrate or read out the hundreds, tens and units pulse registers of the time index. Thus, print power is supplied sequentially on leads 420, 418 and 416 and, in accordance with the digital setting of pulse registers 400, 398 and 396, an appropriate lead in the plural conductor cables 432, 430 and 428 is energized to the digital entry for printing and/or punching. Similarly, continuance of the scan supplies print power on leads 414, 412 and 410 to energize the proper digital entry through pulse registers 394, 392 and 390 of the pressure index register.

Additional contacts of the scan switch 434 are available for various print commands. For example, the scan contact No. 14 is the first print command to be made. If the contact 9C is normal, print power can be supplied on a lead 570 to an "add" solenoid in the terminal equipment which will be energized so that the data can be placed in the memory system of the printer. This enables the total for a batch of chart index readings to be made by the operator by pressing a total button (not shown) located on the printer. The provision for utilization of such information is generally included in various commercially available print-punch terminal equipment. Other modes of operation can be initiated from master control whereby contacts 9C are in the other position, energizing lead 572 for non-add of the index readings.

In this instance, the scan switch 434 has the scan contact No. 15 connected to terminate the scanning sequence. That is, the 90 volts D-C from wiper element 444 through scan contact No. 15 and lead 574 energizes a Relay 6, a motor stop relay, and the relay is held energized by a bypass contact 6B connected to the power source through lead 564. Relay 6 is thereby maintained energized until the next command by the operator; i.e., a subsequent scan initiation command or other digital operation command. It should be understood that additional contacts are available on the scan switch 434 which may be employed to complete electrical circuits for command entry to the print/punch terminal equipment 450. By the proper sequence, the print/punch assembly can be made to print, total, subtract, repeat print, etc. the digits which appear on the chart index counter, the pressure pulse register and the time pulse register. One form of commercially available terminal apparatus is the Friden "Add Punch." This equipment provides not only means for printing out the index information but also means for punching the information on paper tape. A chart guide is also secured to the "Add Punch" equipment for holding the chart so that the same data can be reprinted at manual command on the back of the chart for future reference.

FIG. 15 illustrates the master control system which governs operation and sequence of the integrating and averaging system. The A-C line voltage is applied between leads 580 and 582 to supply the system power. A pair of leads 584 and 586 supply power to the chart integrator 20 (drive motor 22, etc.) in known manner as set forth in the aforementioned U.S. patents. A chart turntable brake-release at chart integrator 20 actuates mechanical linkage 588 to control an automatic reset switch 590 and a scan switch 592. The linkage 588 is actually a plunger moved end-wise by the brake-release when the chart integrator 20 is first placed in integrating operation to thereby energize the automatic reset 590 to reset all system digital counters (as will be described). The plunger 588 also serves to position the scan switch 592 in the scan enabling position when the chart integrator 20 is stopped or braked after an integrating procedure.

When an integration is complete and the chart integrator 20 is braked, scan switch 592 is closed to complete a circuit from lead 594 through a lead 596 to a Relay 7, the prescan control, with return to the A-C supply lead 582. Energization of the prescan control Relay 7 closes contacts 7A to point 598 enabling conduction through closed contacts 10A (time Relay 10 of FIG. 11) to energize Relay 1, the time count stop relay. Energization at point 598 is also available through normally closed contacts 12A to energize the pressure count stop Relay 4, also returned to the A-C supply lead 582. A pair of relay contacts 1B and 4B then act as holding or by-pass contacts to maintain Relay 1 and Relay 4 energized after time Relay 10 and pressure Relay 12 (FIG. 11) have been disabled.

The switching power on lead 596 from scan switch 592 is also conducted on a lead 600 to a printer switch 602. In the "on" position of printer switch 602 conduction is via a lead 604 and lead 606 to relay contacts 3A, 4C and 1C (all previously actuated closed) to a point 608; whereupon the scan motor 436 (FIG. 14) and a scan start Relay 2 are energized through return to A-C lead 582. The normally open contacts 13C provide by-pass of contact 1C during manual scan, and the contacts 9A provide bypass conduction during chart print intervals.

Chart print actuation is effected by energizing Relay 9 by depressing a chart print switch 610 so that the circuit is completed from lead 604 through contacts A of chart print switch 610 and the normally closed relay contacts 6C to energize the chart print Relay 9. When the chart print switch 610 is in its normal position conduction is from lead 604 through the B contacts of switch 610 and via lead 612 to energize the 90 volt D-C power supply 614, the other side of the A-C line being applied on lead 616 from A-C lead 582. A 90 volt D-C output is then available on leads 442 and 550 to the scan switch 434 (see FIG. 14). A pair of leads 554 and 552 supply A-C line voltage for input to transformer 556 of FIG. 14.

Energization of the scan start Relay 2 also reverses contacts 2A to energize the code solenoid 164 (see also FIG. 2) from leads 604 through lead 618 and contacts 2A. When printer switch 602 is placed in its 'off' position, conduction is via a lead 620 through a time delay relay coil 622 and lead 624 to the A-C line 582; the conduction through coil 622 opening the relay contacts 626 after a preset delay. Thus, when scan start Relay 2 is not energized and printer switch 602 is in its "off" position, a short conduction interval is afforded code solenoid 164 in the chart index counter.

A manual scan switch 628 can be depressed to complete a circuit from A-C line 580 through point 630 to energize the manual scan Relay 13. Thus, the momentary depression of manual scan switch 628 energizes relay 613 and closes relay contacts 13B which bypass via reset switch 632 to maintain Relay 13 energized and to further maintain the manual scan brake solenoid 634 energized. Relay contacts 13A are also closed to short between A-C lead 580 and lead 596 by-passing the automatic scan switch 592 to thereby supply scanning power to scan motor 436 and scan start Relay 2. The manual scan switch 628 permits counter digits to be printed without the use of the scan initiation by plunger or linkage 588 from chart integrator 20. Relay 13 remains energized until the reset switch 632 is depressed, at which time power is applied from lead 636 through reset switch 632 and lead 638 to energize the reset solenoid 112 and a reset Relay 5. The reset solenoid 112 (FIG. 2) sets all digital indicators in the chart index counter to zero and the Relay 5 reverses contacts 5A, 5B and 5C of FIG. 11, thereby resetting all pulse registers 390 through 400 (FIG. 12) to zero. A lead 640 connected from the automatic reset 590 to lead 638 carries out the same resetting function automatically in response to mechanical actuation though linkage 588 from chart integrator 20.

A time safety advance Relay 3 is energized through lead 642, relay contacts 10B and normally closed contacts 6A. The relay contacts 10B will be open in response to pulsing or conduction of time Relay 10 (FIG. 11) at which time bypass contacts 3B provide conduction. Relay 3 is only energized during other than the scanning operation when motor stop Relay 6 is not energized and also during the integrating or pulse counting intervals, Relay 3 cannot be energized until the time pulser has advanced through one count to close relay contacts 10B. The A-C supply leads 580 and 582 further supply the primary of a step-down transformer 644 to provide 22.5 volts A-C output on leads 320 and 322 to the pulse control circuits 258 and 268 (FIG. 11).

*Operation*

The operation is described with reference to FIGS. 1 and 15, attention to other figures being noted. The operator first places a polar flow chart on the chart plate 36. Thereafter a brake release is depressed to permit chart plate 36 to rotate and its speed of rotation may be controlled by a foot rheostat in known manner as set forth in the aforementioned U.S. patents. The automatic reset switch 590 is located directly below the brake release plunger 588 and it serves to reset all digital readouts to zero at the start of a chart integration.

The static stylus 40 and differential stylus 42 are made to trace the respective chart traces by means of suitable, well-known control arm manipulation. As the tracing styli 40 and 42 move from zero pressure line, the static roller 50 and differential roller 58 move radially from the center of the time plate 38 and pressure plate 60, respectively; thus varying the number of digital counts produced by the pressure pulser 250 and chart index counter 68. The time pulser 260 provides a digital count at a rate determined by the rotation of the output shaft 28.

The time pulser 260 provides a switch closure on lead 266 at a rate which is a digital equivalent to time. The switch closure is a function of rotational input on shaft 265 to time pulser 260 by means of the rotating permanent magnet 308 and reed switch contacts 312 and 314 (see FIG. 10). The switch closure on lead 266 is then applied to time pulse control 268 which controls a visual readout register, units pulse register 396, tens pulse register 398 and hundreds pulse register 400. The digital impulse produced by time pulse control 268 advances the units visual wheel of units pulse register 396 one digit and, also, the new position makes an electrical path with the equivalent digit solenoid at the key board entry to the printer. Thus, in accordance with the digit in registration at each of pulse registers 396, 398 and 400, an appropriate circuit will be completed to its respective lead in cables 428, 430 and 432 to the digital entry at input 448 of the print/punch assembly 450.

When the units wheel advances from nine to zero, a transfer pulse on lead 406 triggers the tens pulse register 398 to advance it one digit and, similarly, when tens register 398 advances from nine to zero a transfer pulse on lead 408 triggers a single digital advance in the hundreds pulse register 400. During integration, the circuit is completed to the digital entry input 448, but it is not utilized until the integration is completed and the scan or print-out sequence is initiated as will be further described.

The pressure pulser 250 operates in a manner similar to that of the time pulser 260. Pressure pulser 250 is driven by the roller 254 and input shaft 252 to operate a rotary switch consisting of permanent magnet 276 and reed switch contacts 282 and 284 (see FIG. 9). The switch closure or digital pulse indication on lead 256 controls a pressure pulse control 258 to apply digital count pulses on lead 386 to the pressure pulse registers, units pulse register 390, tens pulse register 392 and hundreds pulse register 394. Pressure pulser 250 is positioned to receive rotation along the radius of pressure plate 60 in accordance with predetermined constants in known manner. The digital output controlling pressure pulse control 258 then provides a pressure index readout from the pulse registers 390, 392 and 394. The scan sequence effects the completion of print-out circuits through cables 422, 424 and 426 to the respective solenoid or printing inputs at digital entry input 448 of the print/punch assembly 450. Decade counting and reset of pulse registers 390, 392 and 394 take place in the same manner as in the time index register previously described.

A third index reading, a four-digit chart index, provides a digital reading in accordance with the differential pressure roller 58 as driven by pressure plate 60. The speed of roller 58 is varied in accordance with the positioning of the differential stylus 42 and movement transmitted through square root linkage 54 to position the differential roller 58 along the radius of chart plate 60. Here again, predetermined equipment constants can be set into the integrating apparatus by preadjustment or positioning of the center of chart plates 60 relative to roller 58.

Chart index counter 68 (see FIG. 2) is a decade counter providing a four digit readout and which can be triggered to provide an output electrical indication of the digital representation of each digit wheel. Thus, chart index counter 68 differs from the pressure register and time register in that while it still provides a continuous visual readout, the electrical readout of its digital values must be initiated by separate interrogating circuitry. Thus, referring to FIGURE 2, each of the digital wheels 86 contains a coded cut about its periphery which controls the contacting of switch assemblies 120a–d to thereby control a section of digital code converter 78. The interrogation is done by energization of the code solenoid 164 which withdraws spacer pins 136 from between the contact arms of respective switches 120a through 120d, thereby allowing the switch contacts or arms 122 and portions 124 to move inwardly. The extent of inward movement of switch contacts 124 will be determined by the movement of opposite ends of the respective pivotal segments 130 of switches 120a through 120d; that is, the degree of displacement which the fingers 118 are allowed to make about the edge of each of the respective code wheels 86. This, in turn, depends upon whether or not a cut-out portion or recess 116 (see FIG. 5) exists at a particular point of the digital wheels 86.

FIG. 8 shows the digital code converter 78 subdivided into its four relay converters 182, 184, 186 188 (thousands, hundreds, tens and units respectively) as it is interconnected with each of the code switching assemblies 120a, 120b, 120c and 120d. The interrogation of chart index counter 68 through code solenoid 164 then enables the actuation of the respective relay converters 182–188 in digital code converter 78 to complete a circuit through one lead of each of cables 202, 204, 206 and 208 for energization at digital entry input 448 to print/punch assembly 450.

Thus, at a selected point of completed chart integration, a circuit is complete through the respective cables 202 through 208 and 422 through 432 which can energize a proper digital indicator at the digital entry input 448. The actual completion of each of these circuits is carried out by the scan switch 434 which applies sufficient print power from print power supply 440 through lead 442 and wiper element 444 to print out the respective digits in registration. The print is applied sequentially through contacts Nos. 4 through 13 of the scan switch 434 and sequential scan is effected under the control of scan motor 436 and rotation drive linkage 438. Additional contacts Nos. 14, 15, etc., of scan switch 434 may be utilized for various additional print commands to the print/punch assembly 450. The print/punch assembly 450 may be a commercially available unit such as the previously mentioned Friden Add-Punch assembly. When using the Add-Punch assembly, the data is automatically entered to punch tape of 5, 6, 7 or 8-channel code. This data can then be programed in any suitable manner for automatic calculation through available data processing systems.

The operator maintains full control of the integrating and averaging system through the master control as set forth in FIG. 15. The A-C line input is via leads 580 and 582, and during the initial phase of operation or the time when integration is proceeding and the operator is computing the polar flow characteristics, the chart integrator 20 is energized. At the outset of operation, a brake release plunger 588 actuates automatic reset 590 to reset all digital counters to zero, scan switch 592 is then actuated to the position shown. Print out of index readings may be initiated automatically upon completion of the integration of a flow chart, or the index readings for a portion of a flow chart may be totalized and/or printed out by actuation of a manual scan switch 628.

First, the instance of a total flow chart totalization will be considered. In this procedure, when the chart plate 60 has made a complete revolution (twenty-four hours of recording time) the integrator assembly actuates scan switch 592 to its other position to automatically begin the scan sequence. Also, during the integration period, the time safety advance Relay 3 is actuated after the time pulser 260 has advanced through one count. That is, after the initial energization of time Relay 10, the normally opened relay contact 10B is closed to conduct power from A-C lead 580 through lead 642 and contacts 10B through the normally closed contacts 6A to energize Relay 3. Upon energization of Relay 3 the by-pass contacts 3B maintain Relay 3 energized throughout the integration proceeding despite the periodic opening of time relay contacts 10B. This insures against faulty operation or misprint if the operator fails to lock the brake during a first start attempt. If Relay 3 were omitted and the operator failed to lock the brake, its release would momentarily start the scan motor and a rapid reset of the brake would then stop the scan motor at some position other than a proper starting point to thus cause erroneous print out and sequence of the readout index.

An initiation of the scan sequence, power from A-C lead 580 through lead 594, scan switch 592 and lead 596 is available to actuate Relay 7, the prescan control. Relay 7 closes the normally open contacts 7A providing power from lead 596 to point 598 to actuate the time count stop Relay 1 and the pressure count stop Relay 4. The contact arrangement of normally closed contacts 10A and 12A assure that respective Relays 1 and 4 will be energized only during a noncount interval when the time Relay 10 and pressure Relay 12 (FIG. 11) are de-energized. Actuation of Relay 1 and Relay 4 is then maintained by means of by-pass contacts 1B and 4B. Referring to FIG. 11, it can be noted that energization of Relay 1 and Relay 4 open the relay contacts 1A and 4A to de-energize the time clutch 340 and pressure clutch 388 to cease rotation of the respective clutch assemblies and therefore prevent any further digital count output.

Assuming the print mode of operation, printer switch 602 is in the "On" position and current can flow from source lead 596 through lead 600 and lead 604 to lead 606 whereupon the scan motor 436 and the scan start Relay 2 are energized. The normally opened relay contacts 3A, 4C and 1C are each closed since each of their respective relay coils was previously energized. Energization of scan motor 436 then begins the scan sequence as automatically controlled through the scan switch 434. Referring to FIG. 14, as scan motor 436 begins rotation the switch wiper 44 traverses the switch contacts in sequence to provide ninety volts D-C input via lead 442, lead 550 providing a common connection. The ninety volts D-C voltage is supplied from a power supply (FIG. 15) which is normally energized via leads 612 and 616 and a normally closed section B of chart-print switch 610.

The sequencing of scan switch 434 is automatically controlled by means of the motor direction control Relay 8 and the motor stop Relay 6. When wiper element 444 rotates to contact No. 2 ninety volts D-C is supplied on lead 562 to energize Relay 8, connected at its opposite end to common lead 550. Normally open contacts 8A are then closed to maintain Relay 8 energized even after the wiper element 444 has traversed on to succeeding contacts of scan switch 434. Then as each succeeding contact is made, the ninety volts D-C print power is applied to the respective relay converters 182, 184, 186 and 188 (FIG. 8) and pulse registers 390 through 400 (FIG. 12) in order to provide print power to the proper digital entry at the input 448 to print/punch assembly 450 (FIG. 1).

Contact No. 4 is the first contact closed and ninety volts D-C is passed from wiper element 444 to contact No. 4 and lead 194 to relay converter 182, the thousands digital indication of the chart index. The four-wire conductor 70, conducting in accordance with the respective code switching assembly 120d (see FIG. 8), provides conduction through the respective relays of relay converter 182 to a six volt D-C source on lead 560 to energize one wire of the ten-wire cable 202, which wire is connected to represent a particular digit. FIG. 8 shows the code relay switching with greater particularity. As the wiper element 444 progresses in its rotation, the respective contacts Nos. 5, 6 and 7 are sequentially contacted to energize the respective hundreds, tens and units relay converters 184, 186 and 188.

Continuation of the rotary wiper element 444 contacts each of the contacts Nos. 8 through 13 to further apply print power to each of the time index and pressure index registers to thereby effect digital readout to the terminal printer assembly. The D-C print power appears sequentially on leads 420, 418, 416, 414, 412 and 410 to the respective hundreds, tens and units registers of the time and pressure index registers 400, 398, 396, 394, 392 and 390. Each of the pulse register 390–400 has effected a completed circuit in accordance with its digital indication (see FIG. 13) to energize the proper wire of the respective ten-wire cables 432, 430, 428, 426, 424 and 422 to the digital entry.

Additional print commands can be provided for entry into the terminal printing apparatus by means of remaining contacts of scan switch 434. For example, contact No. 14 provides an "add"/"non-add" output through relay contacts 9C to leads 570 and 572. As shown in FIG. 15, the operator can effect an additional printing, such as on the back of the particular flow chart, by momentary depression of chart print switch 610 to make contacts A and allow conduction through normally closed contacts 6C to energize Relay 9, the chart print relay. This throws contacts 9C (see FIG. 14) to the other position providing output on the "non-add" leads 572 to avoid totalization in the terminal apparatus. Otherwise, when contact 9C is normal, digital command can be made on leads 570 to the "add" solenoid such that the data printed for the chart index may be placed in the memory system of the printer. By providing other contacts of rotary switch 434 for command entry in proper sequence, the printer can be made to "print," "total," "subtract" and "repeat print" the digits of the pressure register, time register and the chart index counter.

A final contact of rotary switch 434, e.g., contact No. 15 as shown, can be utilized for stopping the scan motor and resetting the relay system to begin the subsequent scan sequence. On contact No. 15 the ninety volt D-C power is supplied on lead 574 to energize Relay 6, the stop relay, as normally open contact 8B is closed since Relay 8 is energized. When Relay 6 is energized, the by-pass contacts 6B are closed to maintain Relay 6 energized through subsequent rotation of the wiper 444 of scan switch 434 until the next command of the operator. Thus, actuation of chart print switch 610 (see FIG. 15) breaks the circuit lead 612 de-energizing the ninety volt D-C power supply 614 to release Relay 6 and Relay 8 (FIG. 14).

The system also permits the operator to print the counter digits for less than an entire integration. This may be accomplished by momentary depression of manual scan switch 628 which energizes manual scan Relay 13 and the manual scan brake solenoid 634. The brake solenoid 634 is situated in chart integrator 20 to cease rotation of the integrator system while the subsequent scanning sequence of digital value recovery is carried out. The manual scan Relay 13 closes the normally open relay contacts 13A to provide power from A-C lead 580 to lead 596 thereby bypassing the automatic scan switch 592. Thus, prescan control Relay 7 is energized (lead 596) as before to initiate the scan sequence. That is, the time count stop Relay 1 and pressure count stop Relay 4 are energized closing Relay contacts 4C and 1C such that scan start Relay 2 and scan motor 436 are energized. Relay 3 having been previously energized during integration when the first time pulse closed Relay contacts 3A.

After the scanning sequence has been carried out, either automatically or manually, reset of the respective time and pressure registers 390–400 and the chart index counter 68 can be effected by depressing reset switch 632 such that primary power from A-C lead 580 is supplied via lead 636 and lead 638 to energize the reset solenoid 112 (FIG. 2) of chart index counter 68 and the reset Relay 5 (FIG. 11) to reset each of the respective digital indicators 20. In the event that the printer switch 602 is in its "off" position, power via leads 620 and time delay relay 622 provides a timed application of power through relay contacts 626 and normally closed contacts 2A to code solenoid 164 of chart index counter 68. This then enables visual readout from chart index counter 68 with readout accuracy insured by counter positioning check of star wheel 140 as moved by pivotal member 144 (FIG. 7).

The foregoing sets forth a system for integrating and averaging flow records whereby three variables of an equation can be calculated separately and, if desired, the final flow index can also be calculated. The final data of the three variables can then be printed on paper tape, punched on paper tape or printed on a chart; various available terminal equipments being available for receiving the output information. Further, the punched tape may be arranged in well-known format such that the data can be supplied directly to a conventional type of computer equipment. Flexability permitted as to adjustment and gearing ratio of the integrator system permits wide selection of digital multiplier range to provide great accuracy and to simplify eventual flow calculations.

Changes may be made in the combination and arrangement of elements as heretofore set forth in this specification and shown in the drawings; it being understood, that changes may be made in the embodiments disclosed without departing from the spirit and scope of the invention as defined in the following claims.

What is claimed is:

1. In a chart calculating system for interpretation of polar flow charts which indicate static and differential pressure as a function of time, and wherein the charts are integrated to provide a first rotational output proportional to chart time, a second rotational output which is the product of time and the square root of static pressure, and a third rotational output which is the product of time and the square root of differential pressure, the apparatus comprising:

first means connected to receive said first rotational output and to produce a first series of electrical pulses which are digitally representative of the chart time function during integration of said chart;

first storage means for receiving and storing a total count represented by said first series of electrical pulses;

second means connected to receive said second rotational output and to produce a second series of electrical pulses which are digitally representative of the static pressure function during integration of said chart;

second storage means for receiving and storing a total count represented by said second series of electrical pulses;

third means connected to receive said third rotational output and to produce a third electrical output which is digitally representative of the differential pressure function during integration of said chart;

third storage means for receiving and storing a total count represented by said third electrical output;

terminal storage means for receiving and storing electrical outputs representative of each of said first, second and third total counts; and scanning means for interrogating each of said first, second and third storage means to enable respective electrical outputs digitally representative of said stored total counts for receipt and storage at said terminal storage means.

2. In a chart calculating system for interpretation of polar flow charts which indicate static and differential pressure as a function of time, and wherein the charts are integrated to provide a first rotational output proportional to chart time, a second rotational output which is the product of time and the square root of static pressure, and a third rotational output which is the product of time and the square root of differential pressure, the apparatus comprising:

first pulser means receiving said first rotational output and generating an electrical signal output which is a digital time indication;

first register means receiving said electrical signal and continually storing a digital time index in response thereto;

second pulser means receiving said second rotational output to generate a second electrical signal which is a digital pressure indication;

second register means receiving said second electrical signal at its input and continually storing a digital pressure index in response thereto;

counter means receiving said third rotational output at its input to register a digital index count in proportion thereto;

means actuated by said counter means to generate a coded electrical output representative of said registered count of said counter means;

code converter means receiving said coded electrical output and enabling a digital output equivalent to the count of said counter means;

digital storage means for receiving a plurality of electrical signals representative of selected digital values and placing each of said digital values in parallel storage; and, scanning means for sequentially interrogating each of said first register means, said second register means and code converter means to enable signal output representing respective digital index values for input to said digital storage means.

3. Apparatus as set forth in claim 2 wherein said first pulser means comprises:

input shaft means receiving said first rotational output;

electromagnetic clutch-brake means connected to said input shaft;

output shaft means connected to said clutch-brake means and transmitting said rotation proportional to chart time when said electromagnetic clutch-brake is energized;

permanent magnet means affixed to said output shaft;

reed switch means which is magnetically responsive and aligned adjacent said permanent magnet such that a switch closure is effected for each 180° of rotation to enable conduction in the output; and means energized by said conduction to generate said electrical signal output in the form of a digital pulse output.

4. Apparatus as set forth in claim 3 wherein said first register means comprises:

pulse register means including units, tens and hundreds registers for receiving said digital pulse output and advancing said registration count one unit per pulse.

5. Apparatus as set forth in claim 2 wherein said second pulser means comprises:

input shaft means receiving said second rotational input;

electromagnetic clutch-brake means connected to said input shaft;

output shaft means connected to said clutch-brake means and transmitting said rotation proportional to pressure when said electromagnetic clutch-brake is energized;

permanent magnet means affixed to said output shaft; and reed switch means which are magnetically responsive and aligned adjacent said permanent magnet such that a switch closure is effected for each 180° of rotation to enable conduction in the output; and means energized by said conduction to generate said electrical signal output in the form of a digital pulse output.

6. Apparatus as set forth in claim 5 wherein said second register means comprises:

pulse register means including units, tens and hundreds registers for receiving said digital pulse output and advancing said registration count one unit per pulse.

7. Apparatus as set forth in claim 2 wherein said counter means comprises:

input shaft means receiving said third rotational output;

digit wheels advanced by said input rotation to indicate an index proportional to said third rotational output in units, tens, hundreds and thousands, each place being digitally represented by a separate digit wheel, and each digit wheel including coded switch actuation cut-outs around each side of their periphery which are representative of predetermined digits;

switch assembly means mounted adjacent each of the units, tens, hundreds and thousands digit wheels to generate coded switch closure indication representative of predetermined digital values, said switch closures being controlled by the respective switch actuation cut-outs around each digit wheel.

8. Apparatus as set forth in claim 7 wherein said code converter means comprises:

a plurality of relay converter means representative of units, tens, hundreds and thousands, respectively, of the index count, each relay converter means having a plurality of output leads, each one representing a digital value, and each relay converter receiving said coded switch closure indications from one of said switch assembly means to enable one of said output leads representative of a digital value.

9. In a chart calculating system for interpretation of polar flow charts which indicate static and differential pressure as a function of time, and wherein the charts are integrated to provide a first rotational output proportional to chart time, a second rotational output which is a product of time and the square root of static pressure, and a third rotational output which is the product of time and the square root of differential pressure, the apparatus comprising:

first pulser means including electromagnetic clutch-brake means for receiving said first rotational output on an input shaft and transmitting said first rotation to an output shaft when said clutch-brake is energized;

magnetic switch means driven by said output shaft to generate switch closures in proportion to said first rotation;

second pulser means including an electromagnetic clutch-brake for receiving said second rotational output on an input shaft and transmitting said second rotation to an output shaft when said clutch-brake is energized;

magnetic switch means driven by said output shaft to generate switch closures in proportion to said second rotation;

counter means, including units, tens, hundreds and thousands digit wheels, which is driven by said third rotational output to register a count proportional to said third rotation;

a plurality of switch means integral with said counter means, a switch means positioned adjacent each digit wheel which when enabled provides output switch closures indicative of the digital registry of said digit wheel;

first pulse control means energized by said first rotation switch closures to generate a digital pulse output;

first pulse register means including units, tens and hundreds registers energized by said digital pulse output to provide a visual indication of digital count, each of said units, tens and hundreds registers having a plurality of output leads, each lead representative of a selected digit and enabled only when the digit is in the registry;

second pulse control means energized by said second rotation switch closures and generating a digital pulse output proportional thereto;

second pulse register means including units, tens and hundreds registers energized by said digital pulse output and providing a visual indication of digital count, each of said units, tens and hundreds registers having a plurality of output leads, each lead representative of a selected digit and enabled only when the digit is in registry;

a plurality of relay converters, each one of said relay converters receiving said switch closure outputs from said switch means which is indicative of one of the units, tens, hundreds and thousands digital indication of said counter means, and each relay converter means having a plurality of output leads, each lead representative of a selected digital indication and enabled only when the digit is in registry;

supply means for generating print power;

scanning switch means including a movable switch element connected to said print power and a plurality of contacts which are arranged to be closed in sequence through said wiper element, one of said contacts being connected to supply print power to each of said relay converters and each register of said first and second pulse registers;

scan motor means for driving said wiper element to sequentially conduct through said contacts to apply print power to said first and second pulse registers and said relay converters to energize the registered digital output leads of said corresponding pulse registers and relay converters; and terminal apparatus energized by said output leads to record said selected digital indications.

10. Apparatus as set forth in claim 9 which is further characterized to include:

first reset means for providing an output voltage in parallel to each register of said first and second pulse registers to cause each register to move to zero digital indication; and second reset means including a reset solenoid which when energized causes all digit wheels of said counter means to move to zero digital indication.

11. Apparatus as set forth in claim 9 which is further characterized to include:

means energized by said chart calculating system upon completion of a polar flow chart integration for de-energizing said first and second pulse means and energizing said scan motor means to initiate the operation of said scan switch means to sequentially apply print power to each of said relay converters and registers in sequence thereby energizing the proper digital output lead of each relay converter and register.

12. Apparatus as set forth in claim 9 which is further characterized to include:

manual scan means for de-energizing said first and second pulser means and stopping said calculating system to cease said first, second and third rotational outputs, said manual scan means energizing said scan motor to initiate a scan sequence by said scan switch means.

13. Apparatus as set forth in claim 9 wherein said first and second pulse control means each comprise:

a D-C power supply;

a capacitor connected to one side of the output of said D-C power supply;

first relay means energized by said switch closure input and having relay contacts which connect said capacitor to the other side of said D-C supply when deenergized;

reed relay coil means energized by discharge of said capacitor when said first relay means is energized to actuate its contacts closed and thereby conduct a square wave output voltage from said D-C power supply to said respective pulse register means.

14. An integrating and averaging system for interpretation of polar flow charts which indicate static and differential pressure as a function of time which includes a drive motor chart plate means driven by said drive motor output at a constant rotational speed, time plate means driven by said drive motor at a constant rotational speed, static roller means driven by said time plate means, linkage means for axially moving said static roller means radially across said time plate means by the square root of the variation of said static pressure indication, pressure plate means driven by said static roller means, differential roller means driven by said pressure plate means, and linkage means for axially moving said differential roller means radially across said pressure plate means by the square root of the variation of said differential pressure indication, the improvement comprising:

gear means driven by said drive motor output to provide a constant rotational output in proportion thereto;

first pulser means receiving said constant rotational output and generating an electrical signal output which is a digital time indication;

first pulse register means including units, tens and hundreds registers for receiving said electrical signal and continually storing a digital time index in response thereto while enabling an output circuit from each register which is representative of the stored digit;

roller means driven by said pressure plate means at a rate further determined by the radial point of contact of said roller means upon said pressure plate means for providing a second rotational output;

second pulser means receiving said second rotational output to generate an electrical signal which is a digital pressure indication;

second pulse register means including units, tens and hundreds registers for receiving said second electrical signal at its input and continually storing a digital pressure index in response thereto while enabling an output circuit from each register which is representative of the stored digit;

counter means receiving rotational input from said differential roller means to register a chart index count upon units, tens, hundreds and thousands digit wheels in proportion to said input rotation;

means integral with said counter means to generate a coded electrical output for each digit wheel which coded output is representative of the digital count of each of said digit wheels;

code converter means including units, tens, hundreds and thousands relay converters for receiving said coded electrical outputs and enabling an output circuit representative of the registered digit of said digit wheels;

digital storage means connected to each of the plurality of output circuits from said registers and relay converters for receiving energization representative of the digital values and placing each of said values in parallel storage; and scanning means for sequentially enabling the output from each of said register means and relay converter means for input to said digital storage means.

15. Apparatus as set forth in claim 14 wherein said first and second pulser means each comprise:

input shaft means receiving rotational input;

electromagnetic clutch-brake means connected to said input shaft;

output shaft means connected to said clutch-brake means and transmitting said rotation when said electromagnetic clutch-brake is energized;

permanent magnet means affixed to said output shaft; and reed switch means which is magnetically responsive and aligned adjacent said permanent magnet such that a switch closure is effected for each 180° of rotation.

16. Apparatus as set forth in claim 14 wherein said first and second pulse register means each comprise:

units register means responsive to an input pulse to advance the count one digit and which provides both a visual indication and the completion of a representative circuit between an input circuit and one of a plurality of output circuits which is representative of a particular digit;

tens register means responsive to an input pulse from said units register means for advancing the count one digit and which provides both a visual indication and a circuit completion between an input circuit and one of a plurality of output circuits which is representative of a particular digit; and hundreds register means responsive to an input pulse from said tens register means to advance the count one digit and which provides both a visual indication and a circuit completion between an input lead and one of a plurality of output circuits which is representative of a particular digit.

17. Apparatus as set forth in claim 16 wherein said scanning means comprises:

a power supply providing a print power output;

scan switch means having a plurality of contacts and a rotary wiper element which is connected to said print power output;

scan motor means to be enabled such that said wiper element is moved to sequentially contact each of the plurality of scan switch means contacts;

a plurality of leads connected to said contacts to apply print power to each respective ones of said relay converters and said units, tens and hundreds registers such that the circuit completion within the individual relay converters and registers will energize the appropriate circuit representative of a selected digit at said digital storage means.

18. In an integrating and averaging system, a counter and signal producing mechanism comprising a main body portion, a plurality of digit wheels rotatable within said body portion, drive means for said wheels, a plurality of switches, switch actuating fingers adapted to extend into engagement with said wheels, means for stopping said drive means, recesses defined by said wheels cooperating to effect movement of said switch actuating fingers into said recesses after stopping of said drive means whereby said swtiches can be opened and closed by said switch actuating means, said switches comprising contact arms formed as extensions of said fingers and contact plates adapted to be engaged by said contact arms when said fingers are moved into said recesses, said recesses being spaced-apart and being formed in the periphery on each side of each wheel, said fingers straddling each wheel and spring means normally urging said fingers toward said wheels, holding means for normally holding said fingers out of the path of movement of said wheels in opposition to said spring means, and means for moving said holding means after stopping of said drive means to permit placement of said fingers in these recesses which are in position opposite the fingers, and including pivotally mounted members for carrying said arms and said fingers, said spring means normally urging said members to pivot said fingers toward said recesses, and wherein said holding means engage said members to hold said fingers out of the path of movement of said wheels, and including a solenoid operatively connected to said holding means for moving said holding means.

19. A mechanism in accordance with claim 18 wherein said holding means which engage said members comprise pins interposed between said members, said pins having a cam action with respect to said members whereby movement of the pins between the members results in movement of the members and corresponding movement of said fingers.

20. A mechanism in accordance with claim 19 including means adapted to move into engagement with said digit wheels prior to movement of said fingers into said recesses, said last mentioned means being adapted to move said digit wheels to whole digit positions whereby said fingers can be accurately positioned with respect to said recesses.

21. A mechanism in accordance with claim 20 wherein said pins and said means for moving the digit wheels to whole digit positions are linked together, and including lost motion means incorporated in the linking means whereby movement of said pins will follow positioning of said digit wheels at whole digit positions.

References Cited

UNITED STATES PATENTS

| | | | |
|---|---|---|---|
| 2,207,743 | 7/1940 | Larson et al. | 340—204 |
| 2,773,642 | 12/1956 | McGay et al. | 235—61 |
| 2,822,130 | 2/1958 | Nolde et al. | 235—61 |
| 2,855,585 | 10/1958 | Quinby | 340—174 |
| 2,864,554 | 12/1958 | Rolph et al. | 235—60.12 |
| 2,894,683 | 7/1959 | Davis | 235—61 |
| 2,895,121 | 7/1959 | Bliss | 340—147 |
| 3,117,719 | 1/1964 | Wapner et al. | 235—58 |
| 3,169,699 | 2/1965 | Demos | 235—61 |

STEPHEN J. TOMSKY, *Primary Examiner.*